US010687666B2

(12) United States Patent
Bucklew et al.

(10) Patent No.: US 10,687,666 B2
(45) Date of Patent: Jun. 23, 2020

(54) INDOOR OUTDOOR PORTABLE GRILL

(71) Applicant: Columbia Insurance Company, Omaha, NE (US)

(72) Inventors: William A. Bucklew, Wilmette, IL (US); Michael R. Mastroianni, Crystal Lake, IL (US); Ross Bartels, Chicago, IL (US)

(73) Assignee: COLUMBIA INSURANCE COMPANY, Omaha, NE (US)

(*) Notice: Subject to any disclaimer, the term of this patent is extended or adjusted under 35 U.S.C. 154(b) by 331 days.

(21) Appl. No.: 15/884,533

(22) Filed: Jan. 31, 2018

(65) Prior Publication Data
US 2018/0220843 A1 Aug. 9, 2018

Related U.S. Application Data

(60) Provisional application No. 62/454,140, filed on Feb. 3, 2017.

(51) Int. Cl.
A47J 37/07 (2006.01)

(52) U.S. Cl.
CPC ....... *A47J 37/0709* (2013.01); *A47J 37/0763* (2013.01); *A47J 2037/0777* (2013.01)

(58) Field of Classification Search
CPC ..... A47J 37/0709; A47J 37/0629; A47J 37/07
USPC .......................................... 219/452.11, 450.1
See application file for complete search history.

(56) References Cited

U.S. PATENT DOCUMENTS

| 3,045,581 A | 7/1962 | Bernstein |
| 3,712,819 A | 1/1973 | Field |
| 5,036,180 A | 7/1991 | Scott |
| 5,355,779 A * | 10/1994 | O'Brien ............... A47J 37/0694 99/446 |
| 5,862,741 A | 1/1999 | Wodeslavsky |
| 5,865,099 A * | 2/1999 | Waugh ................ A47J 37/0704 126/25 R |

(Continued)

FOREIGN PATENT DOCUMENTS

| CN | 2862918 Y | 1/2007 |
| CN | 1989887 A | 7/2007 |

(Continued)

OTHER PUBLICATIONS

International Search Report and Written Opinion for PCT/US2018/016566 dated Apr. 12, 2018.

*Primary Examiner* — Lauren A Crane
(74) *Attorney, Agent, or Firm* — Thompson Coburn LLP

(57) ABSTRACT

A cooking appliance has a base with an upstanding wall defining a hollow interior with an opening. The base is configured to support a cooking grate adjacent to the opening. A lid is configured to be removably attached to the base and allow access to the cooking grate. An electrical cooking element is spaced from the grate and positioned in the hollow interior. A passage is formed in the upstanding wall and has a closure moveable between a closed position and an open position. In the open position, the passage receives and supports the cooking element in the hollow interior of the base to enable cooking with electricity via the cooking element. In the closed position, the closure of the passage at least partially blocks access through the passage into the hollow interior to enable cooking with a combustible solid material deposited in the base without the cooking element.

20 Claims, 30 Drawing Sheets

(56) References Cited

U.S. PATENT DOCUMENTS

| | | |
|---|---|---|
| 6,035,770 A | 3/2000 | Whitefield |
| 6,037,571 A | 3/2000 | Christopher |
| 2004/0089163 A1 | 5/2004 | Elwedini |
| 2006/0054157 A1 | 3/2006 | Wang et al. |
| 2006/0191895 A1 | 8/2006 | Li et al. |
| 2009/0205513 A1 | 8/2009 | Sacherman et al. |
| 2010/0071566 A1 | 3/2010 | Liu |
| 2016/0206139 A1 | 7/2016 | Johnson |

FOREIGN PATENT DOCUMENTS

| | | |
|---|---|---|
| CN | 201234911 Y | 5/2009 |
| CN | 205041248 U | 2/2016 |
| DE | 202012006160 U1 | 7/2012 |
| ES | 1065028 U | 6/2007 |
| FR | 2898800 B1 | 11/2013 |
| KR | 20050017839 A | 2/2005 |
| KR | 101641461 B1 | 7/2016 |
| WO | 2007031983 A2 | 3/2007 |
| WO | 2012174702 A1 | 12/2012 |

\* cited by examiner

US 10,687,666 B2

INDOOR OUTDOOR PORTABLE GRILL

CROSS-REFERENCE TO RELATED APPLICATIONS

This application claims the benefit of provisional application Ser. No. 62/454,140, filed Feb. 3, 2017, the disclosure of which is incorporated by reference herein.

BACKGROUND AND SUMMARY

This disclosure is related to an indoor outdoor portable grill for grilling food. The grill is configured to allow use as an electric grill or a charcoal grill. When configured to operate on electricity, the grill may be used indoors or outdoors. When configured to operate via charcoal, the grill may be used outdoors. The grill is configured with a removable cooking element for electric use. When configured to operate on electricity, the removable cooking element may be installed in the grill. When configured to operate via charcoal, the removable cooking element may be removed. When configured to operate on electricity, the grill grate covers the electric cooking element to reduce smoke from foods that are cooking on the grate. The lid may have locking clasps. The grill may be 15½ inches wide, 16 inches tall (with the lid installed), and have a square shaped 13¼ inch×13¼ inch cooking surface. The electric cooking element may have an adjustment (e.g., a dial) to change the wattage of the cooking element and thus the cooking temperature inside the grill. The electric cooking element may have a red light that indicates that the cooking element is drawing power from a power source and that the cooking element is heating. The light may turn on and off periodically as the cooking element adjusts to maintain temperature. The cooking element may be powered by a 110-120 VAC power source. The grill may be provided with vents. Leaving the vents open will tend to decrease the temperature inside the grill. Closing the vents will tend to increase the temperature inside the grill.

DETAILED DESCRIPTION

Figure 1:
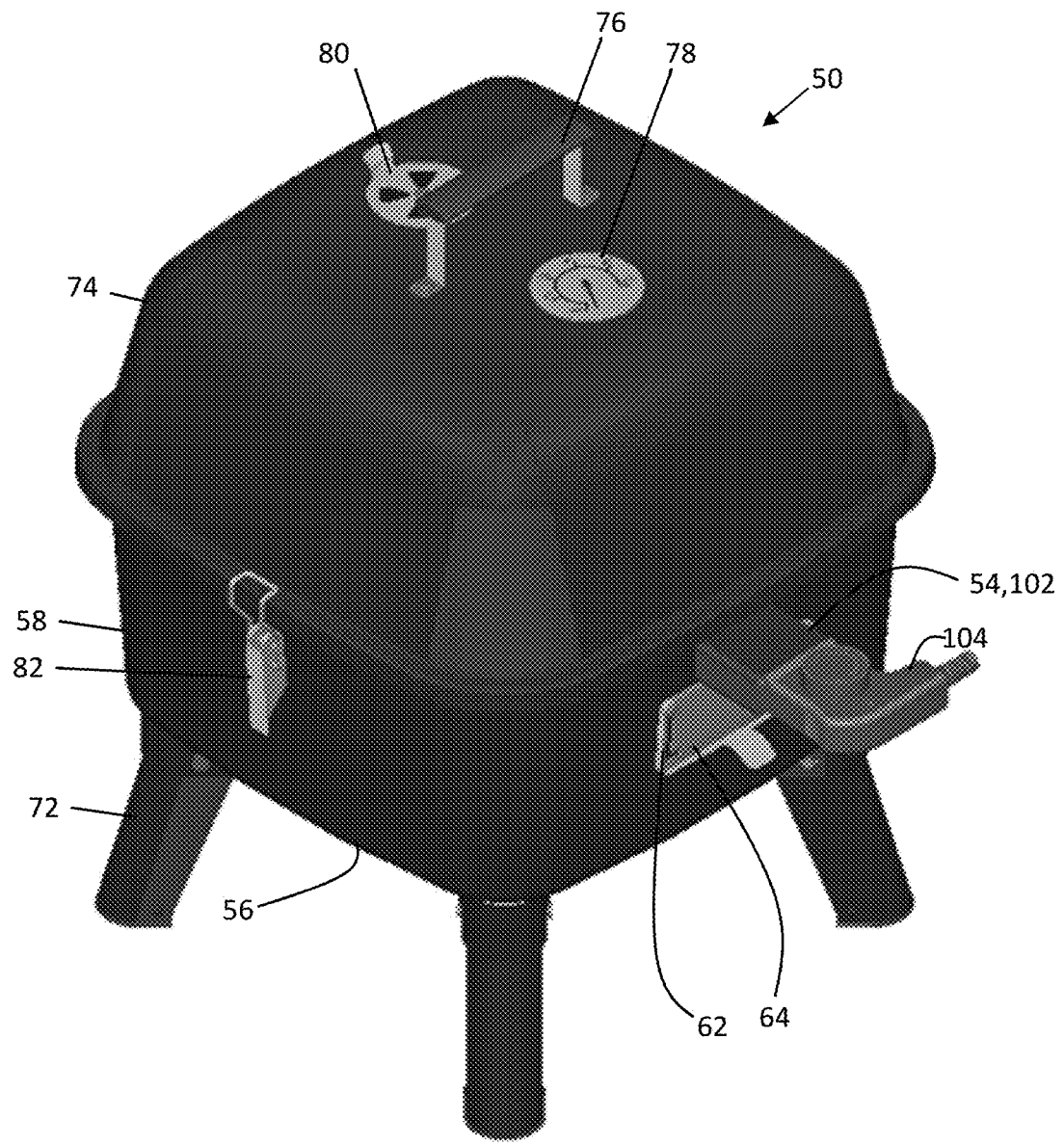
FIG. 1 shows a perspective view of an indoor outdoor portable grill as described herein.
Figure 2:
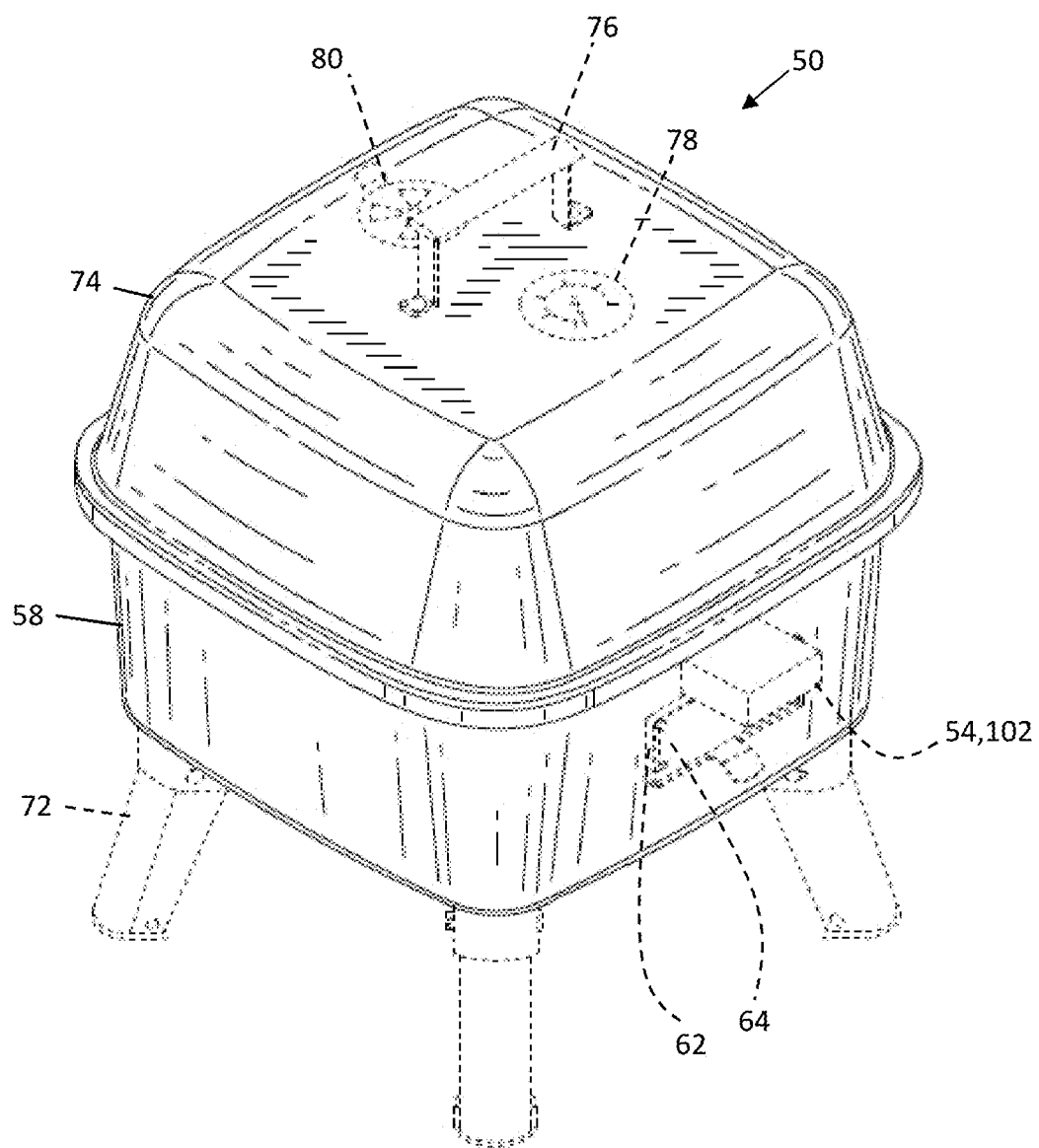
FIG. 2 shows a perspective view of an alternate embodiment of the indoor outdoor portable grill.
Figure 3:
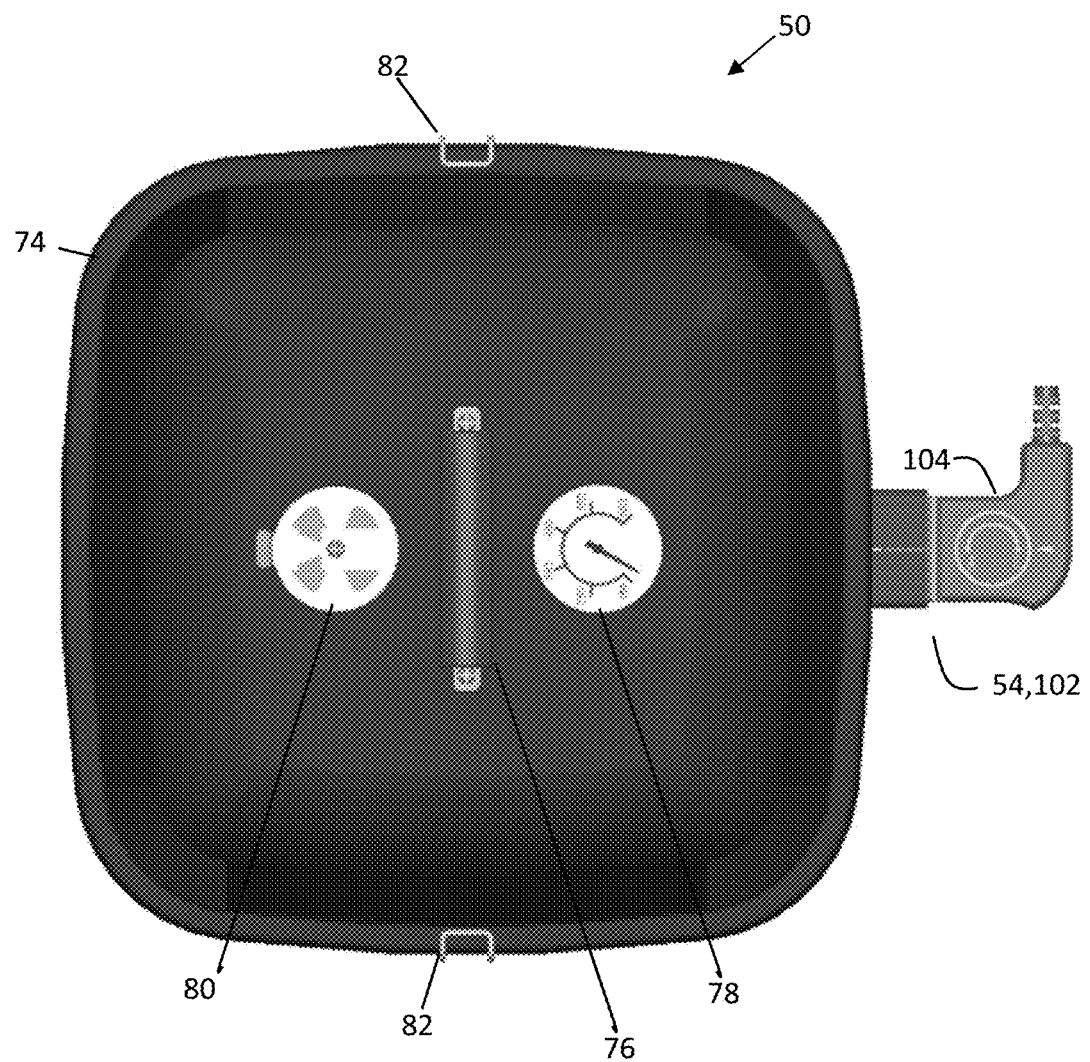
FIG. 3 shows a top view of the indoor outdoor portable grill of FIG. 1.
Figure 4:
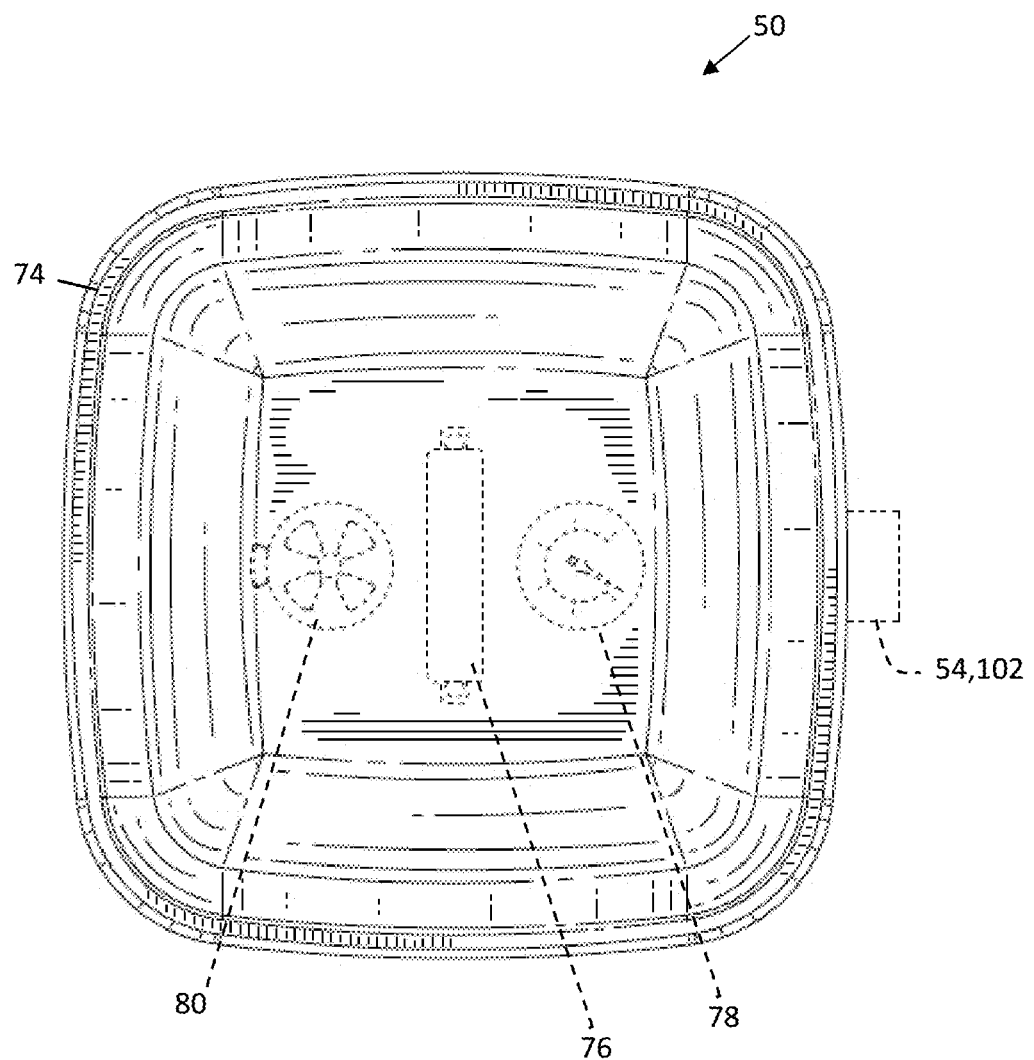
FIG. 4 shows a top view of the indoor outdoor portable grill of FIG. 2.
Figure 5:
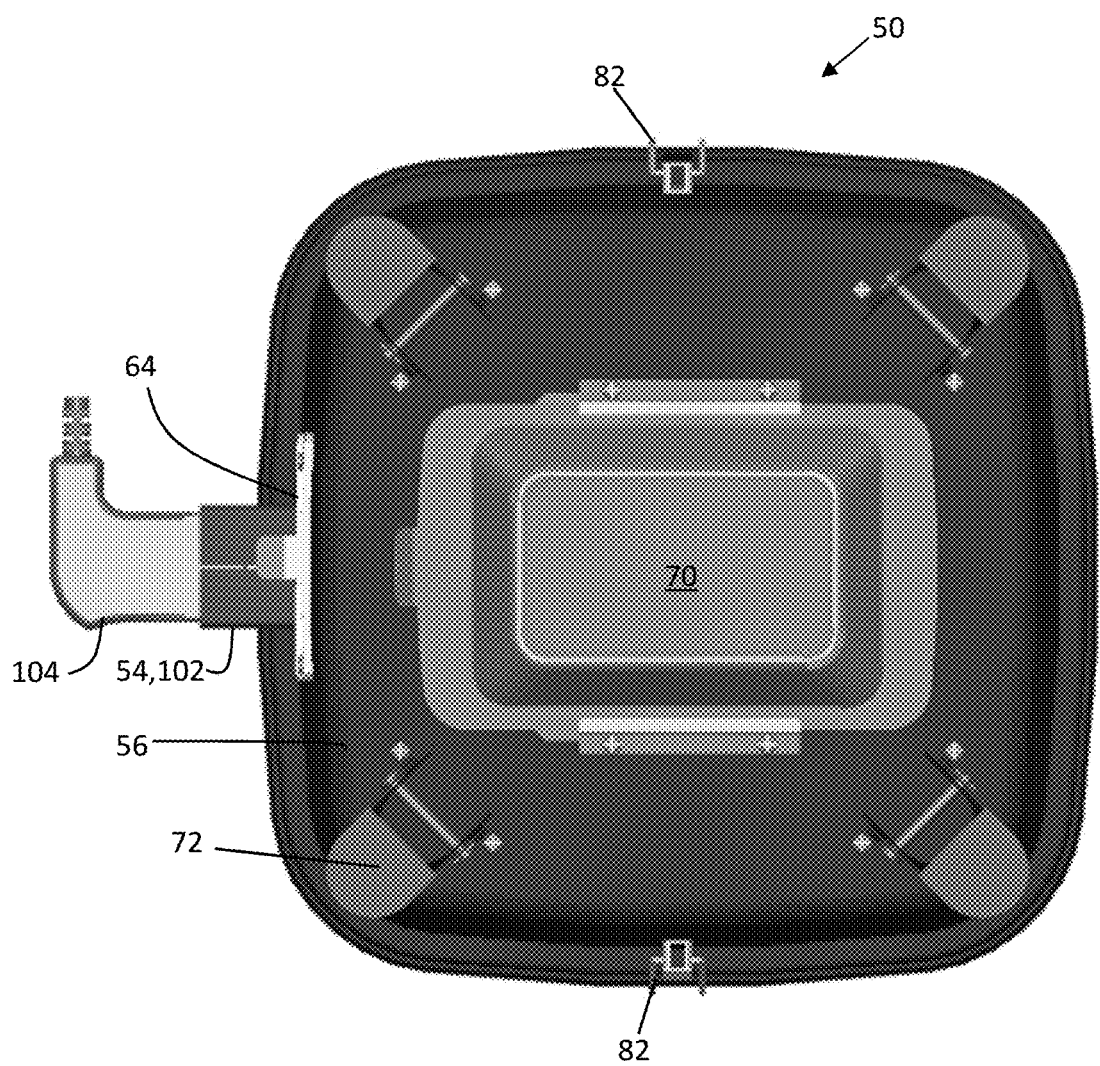
FIG. 5 is a bottom view of the indoor outdoor portable grill of FIG. 1.
Figure 6:
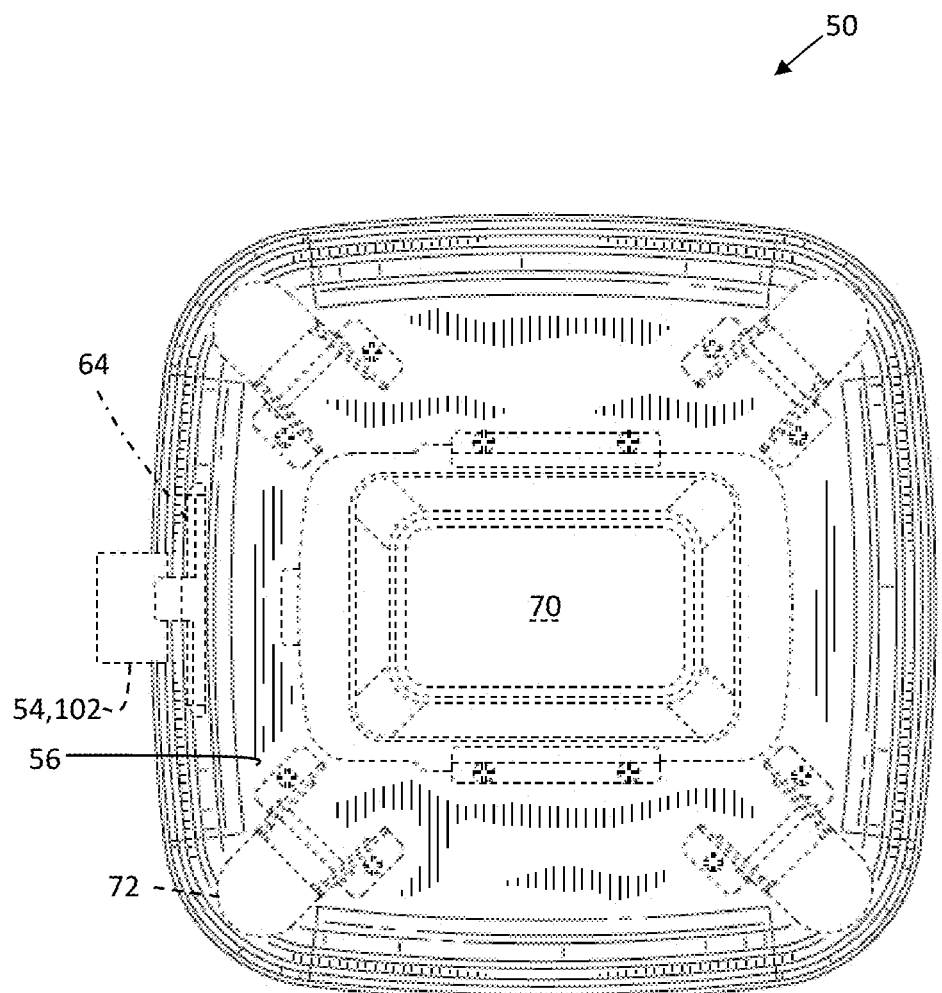
FIG. 6 is a bottom view of the indoor outdoor portable grill of FIG. 2.
Figure 7:
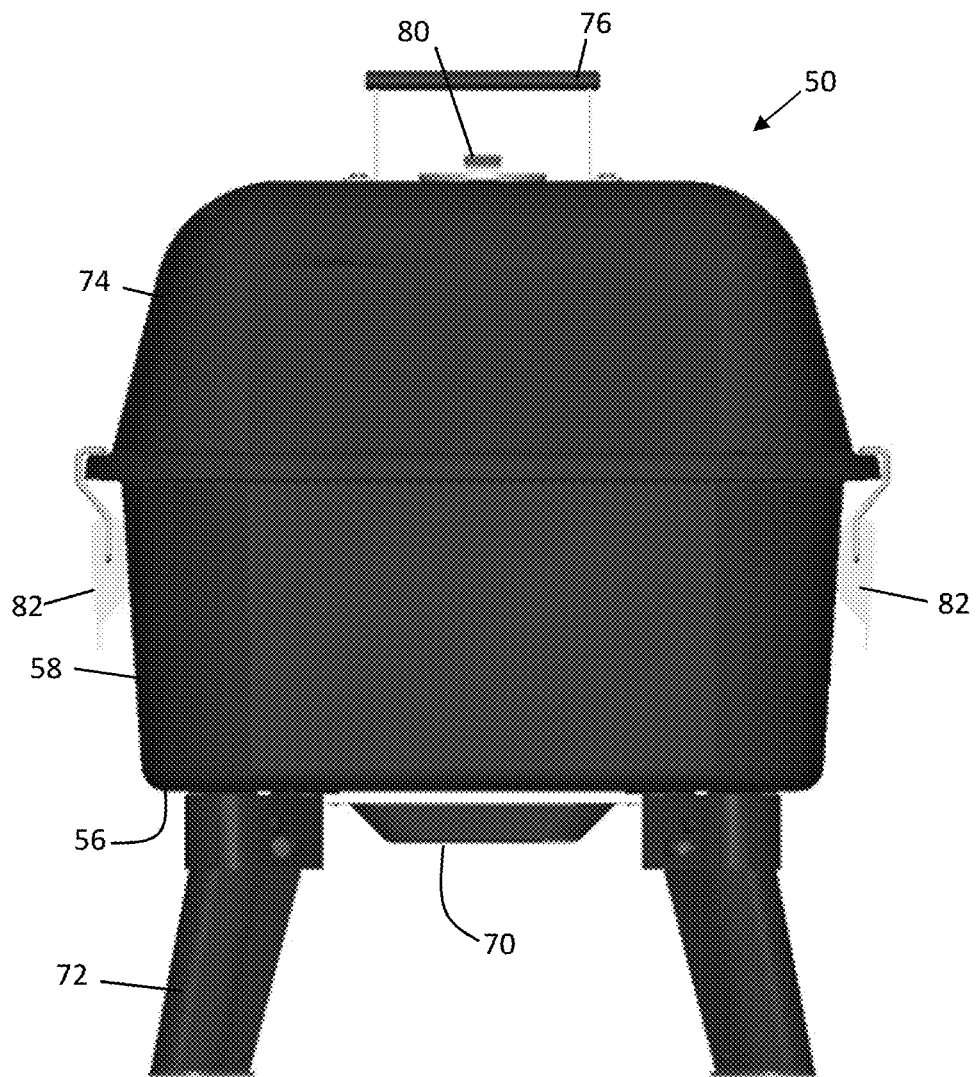
FIG. 7 is a rear view of the indoor outdoor portable grill of FIG. 1.
Figure 8:
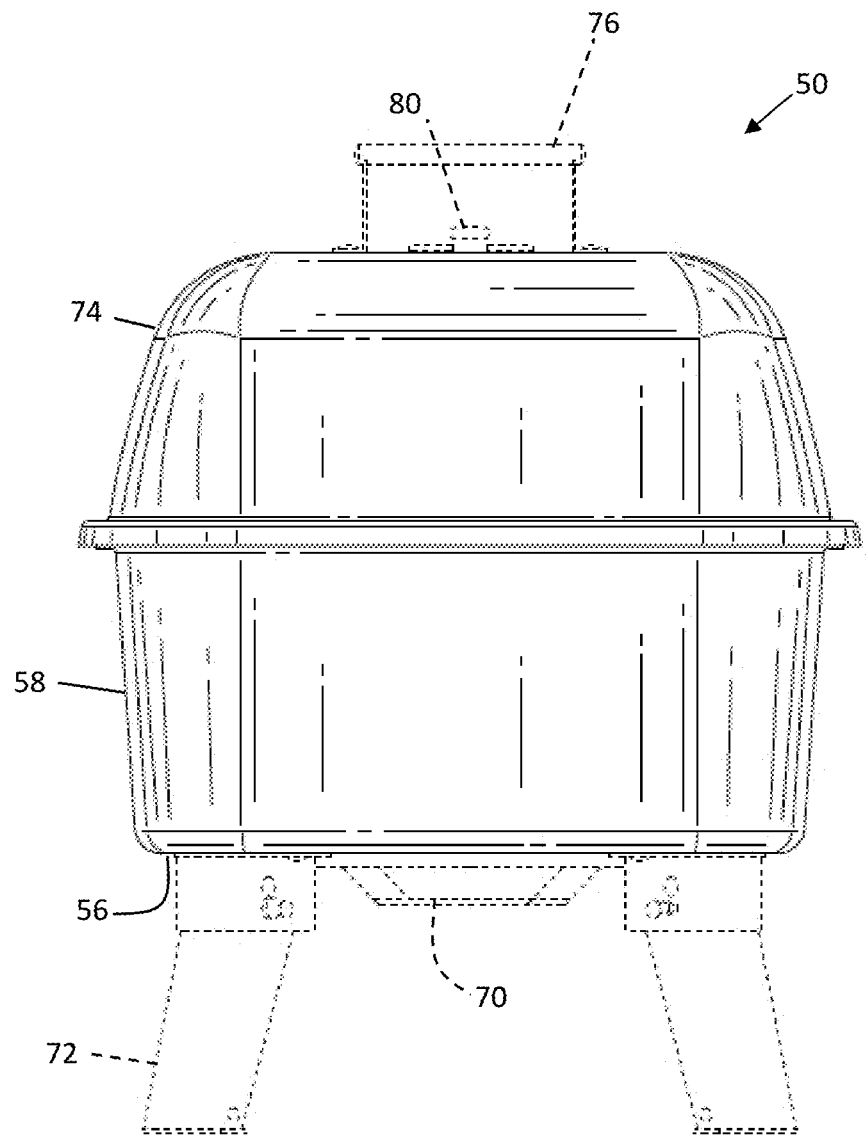
FIG. 8 is a rear view of the indoor outdoor portable grill of FIG. 2.
Figure 9:
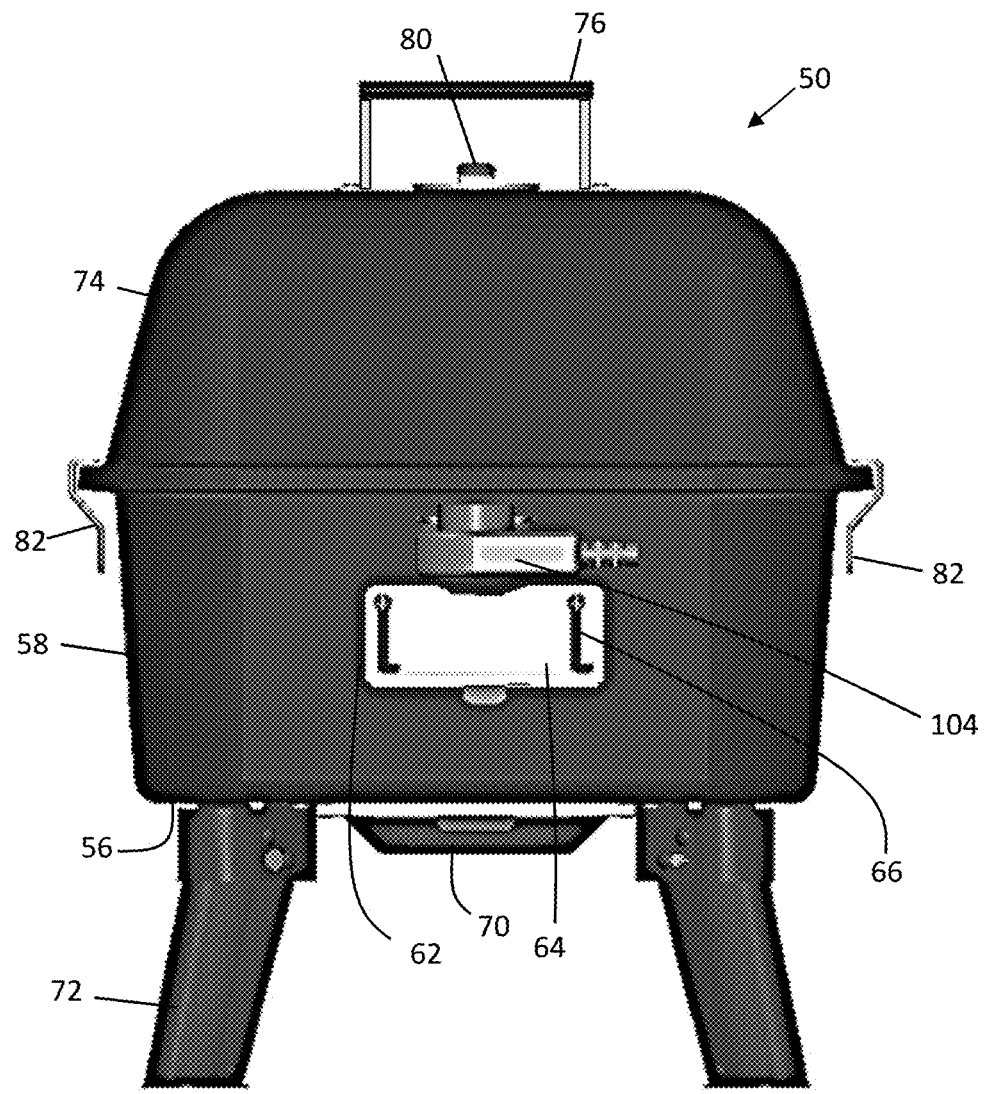
FIG. 9 is a front view of the indoor outdoor portable grill of FIG. 1.
Figure 10:
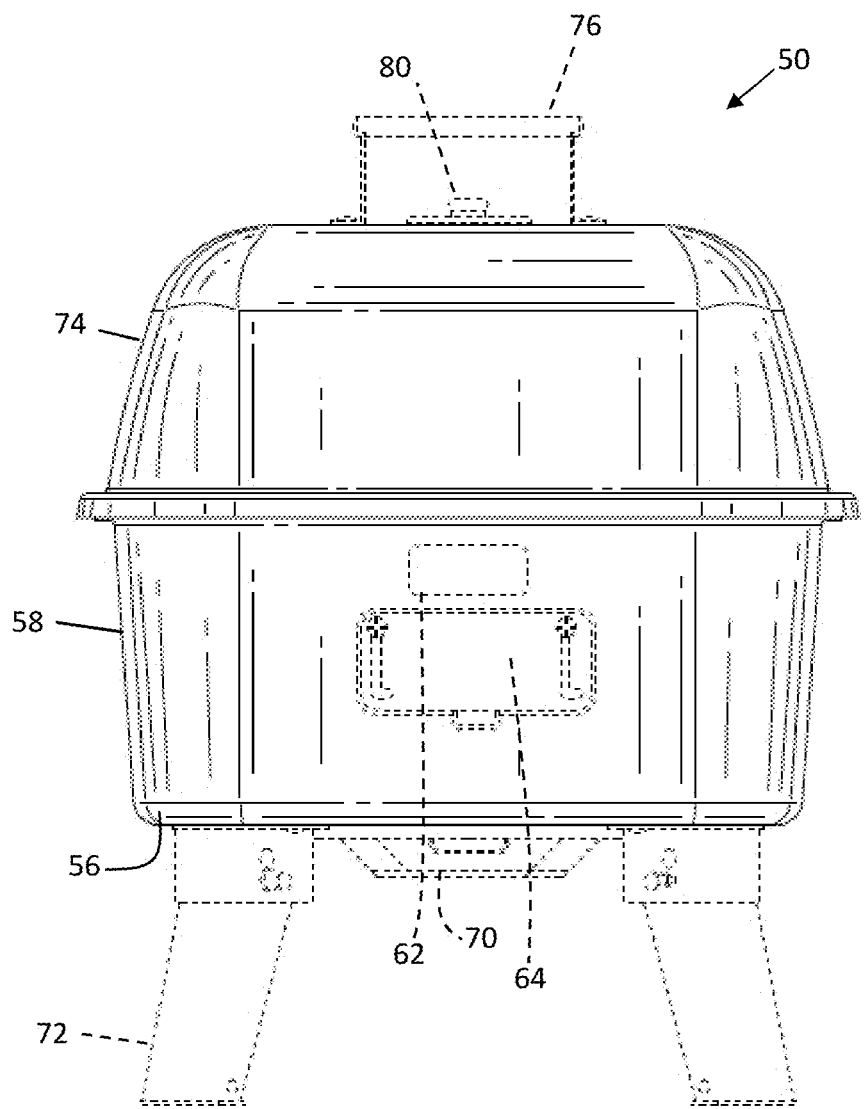
FIG. 10 is a front view of the indoor outdoor portable grill of FIG. 2.
Figure 11:
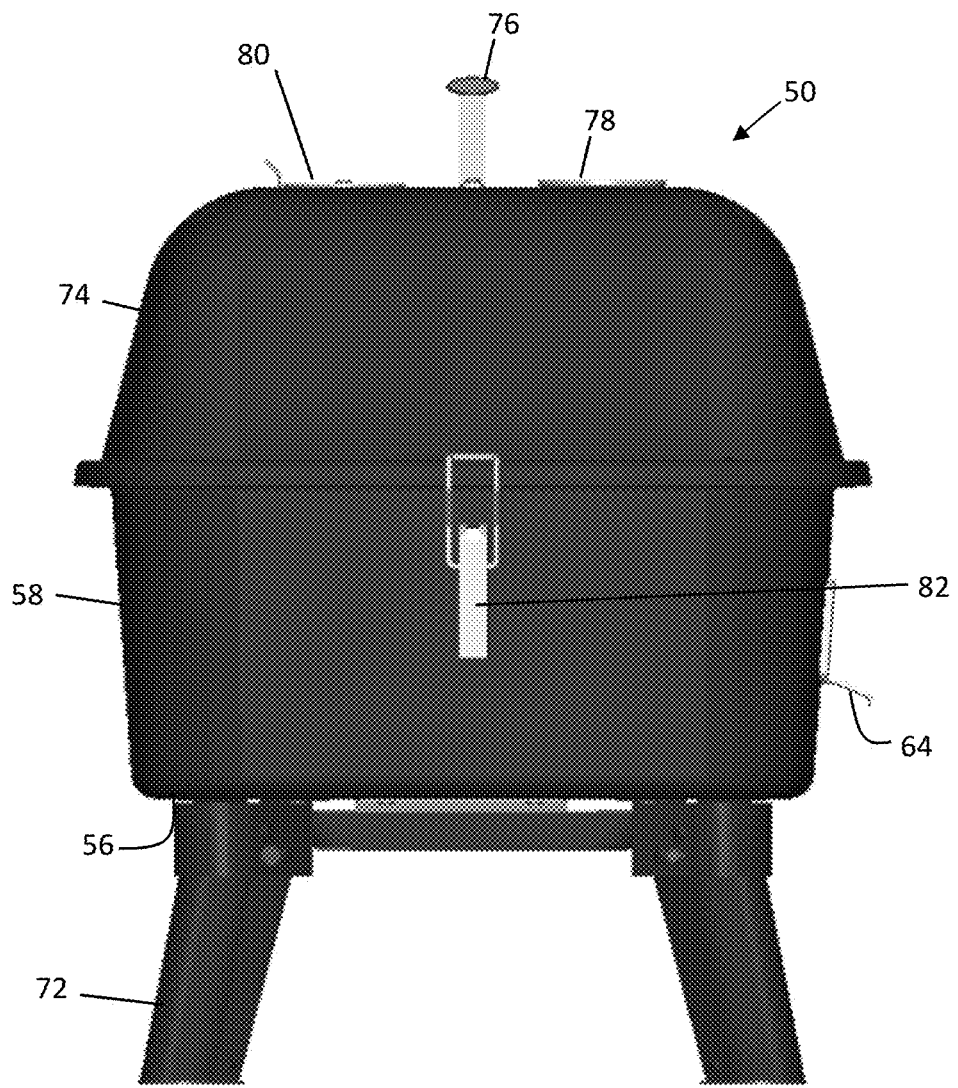
FIG. 11 is a left side view of the indoor outdoor portable grill of FIG. 1.
Figure 12:
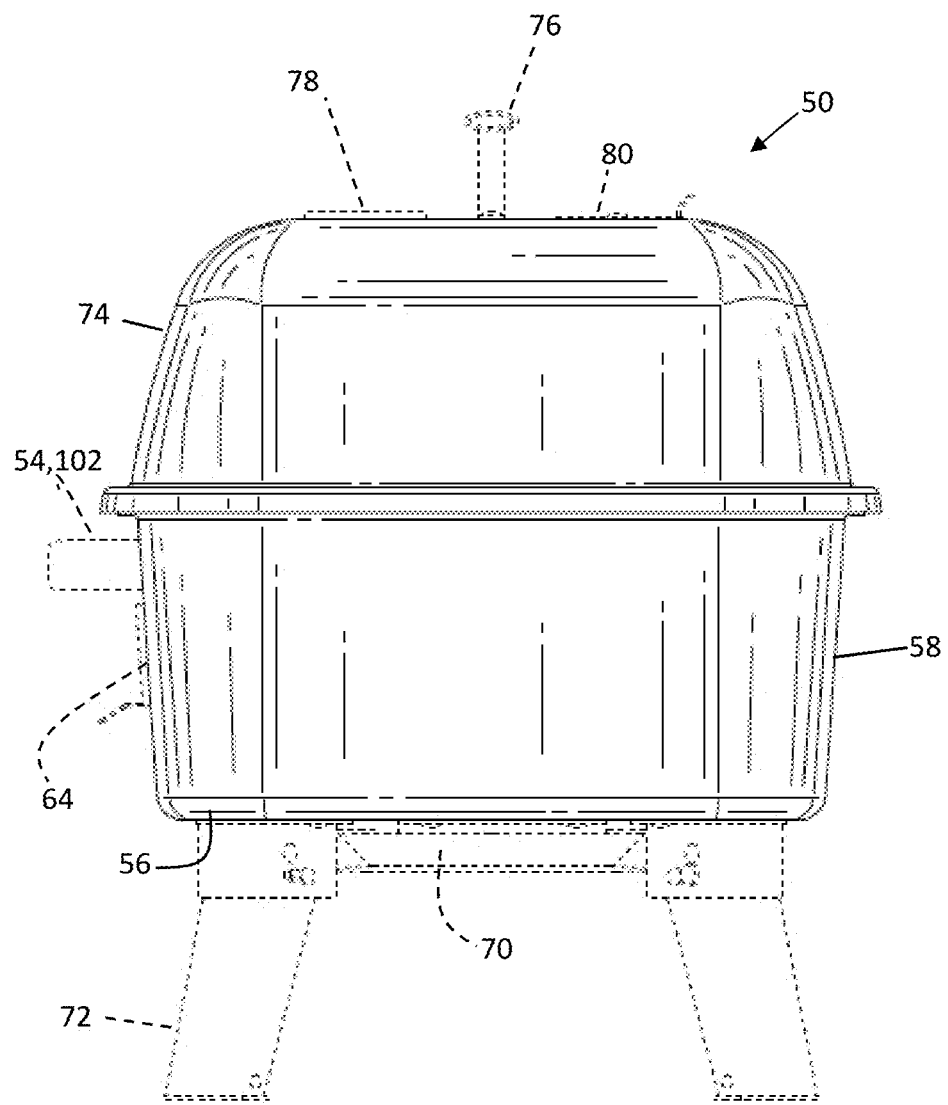
FIG. 12 is a left side view of the indoor outdoor portable grill of FIG. 2.
Figure 13:
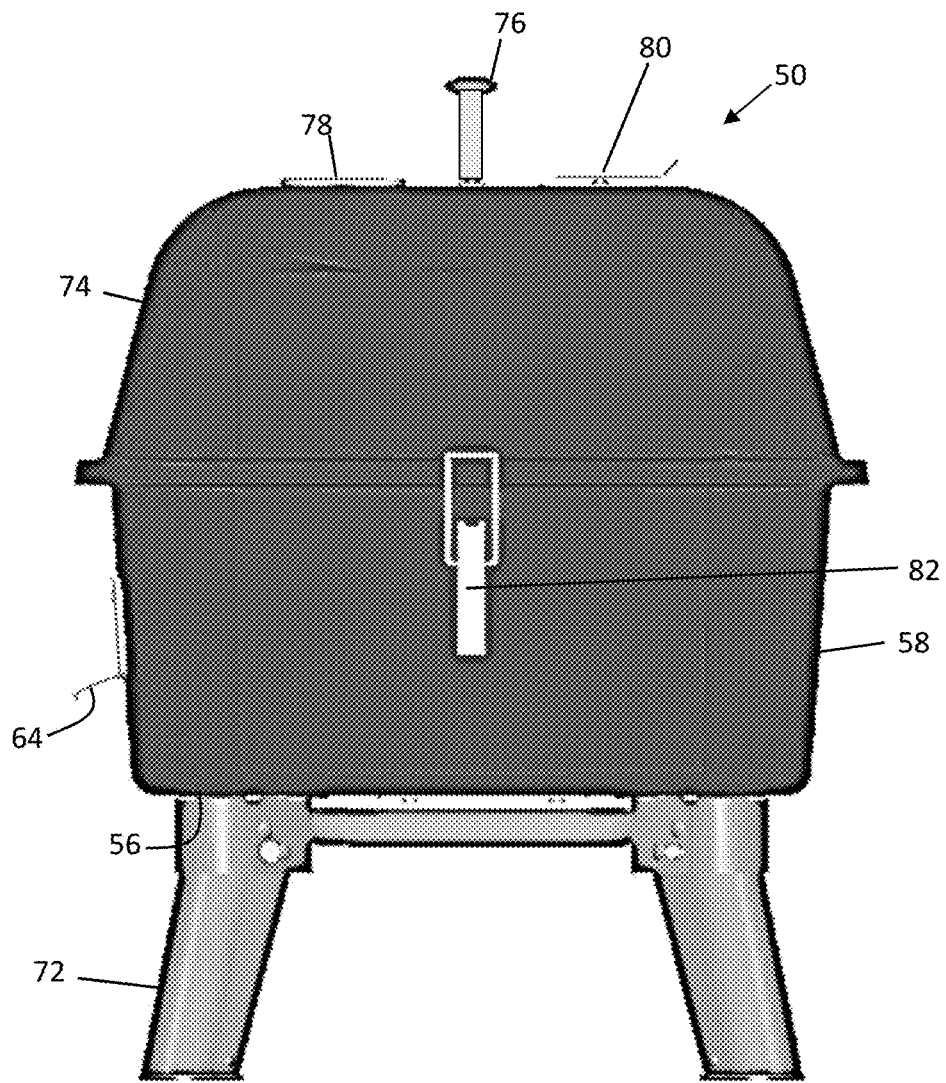
FIG. 13 is a right side view of the indoor outdoor portable grill of FIG. 1.
Figure 14:
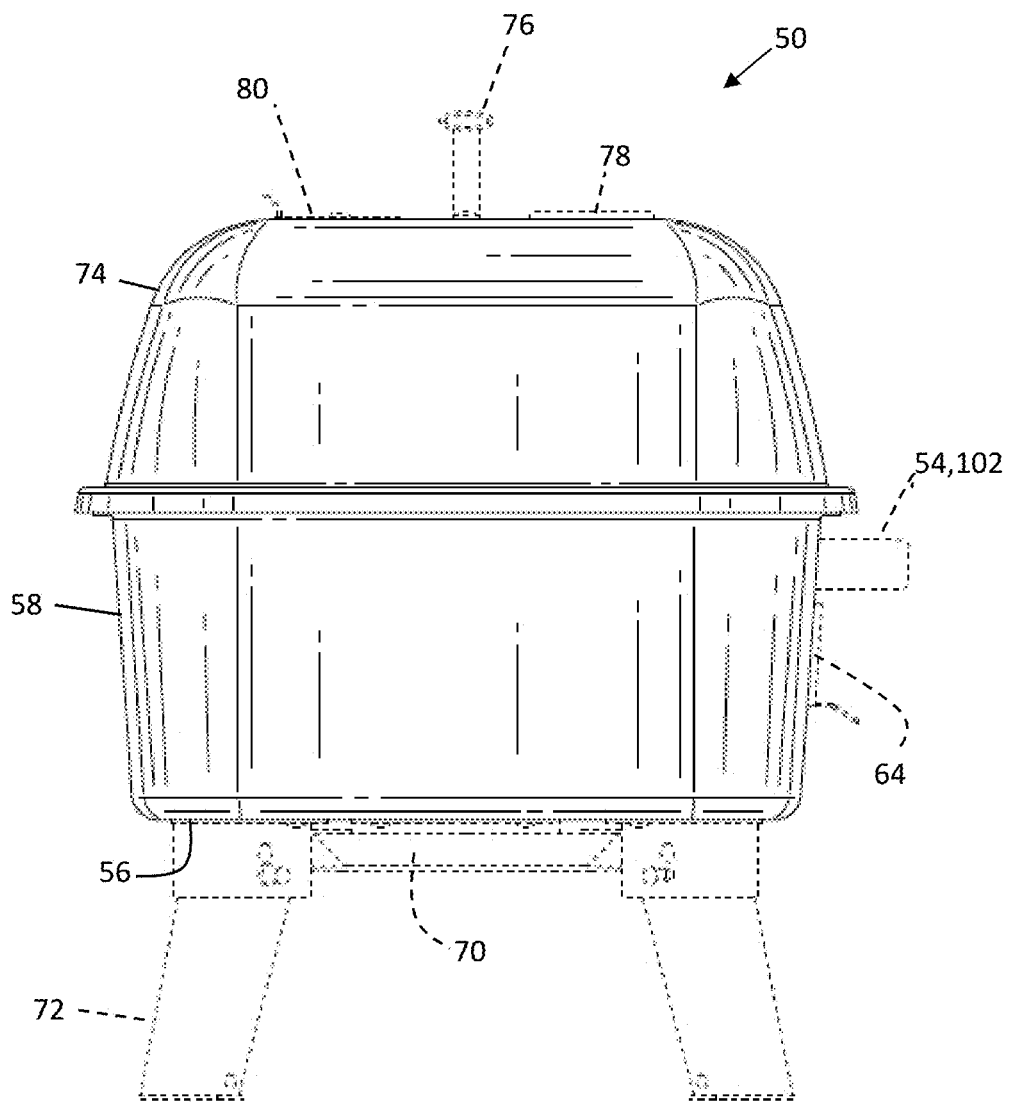
FIG. 14 is a right side view of the indoor outdoor portable grill of FIG. 2.
Figure 15:
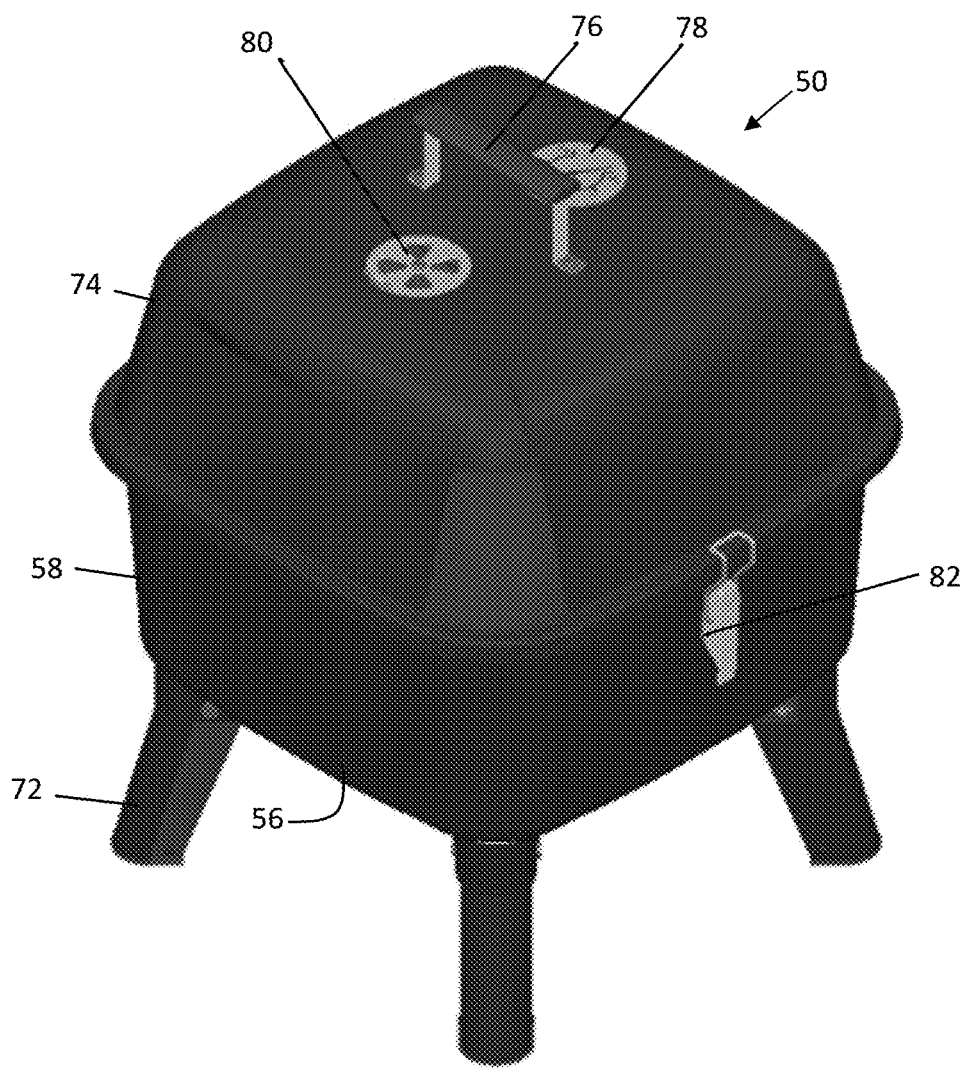
FIG. 15 is an alternate perspective view of the indoor outdoor portable grill of FIG. 1.
Figure 16:
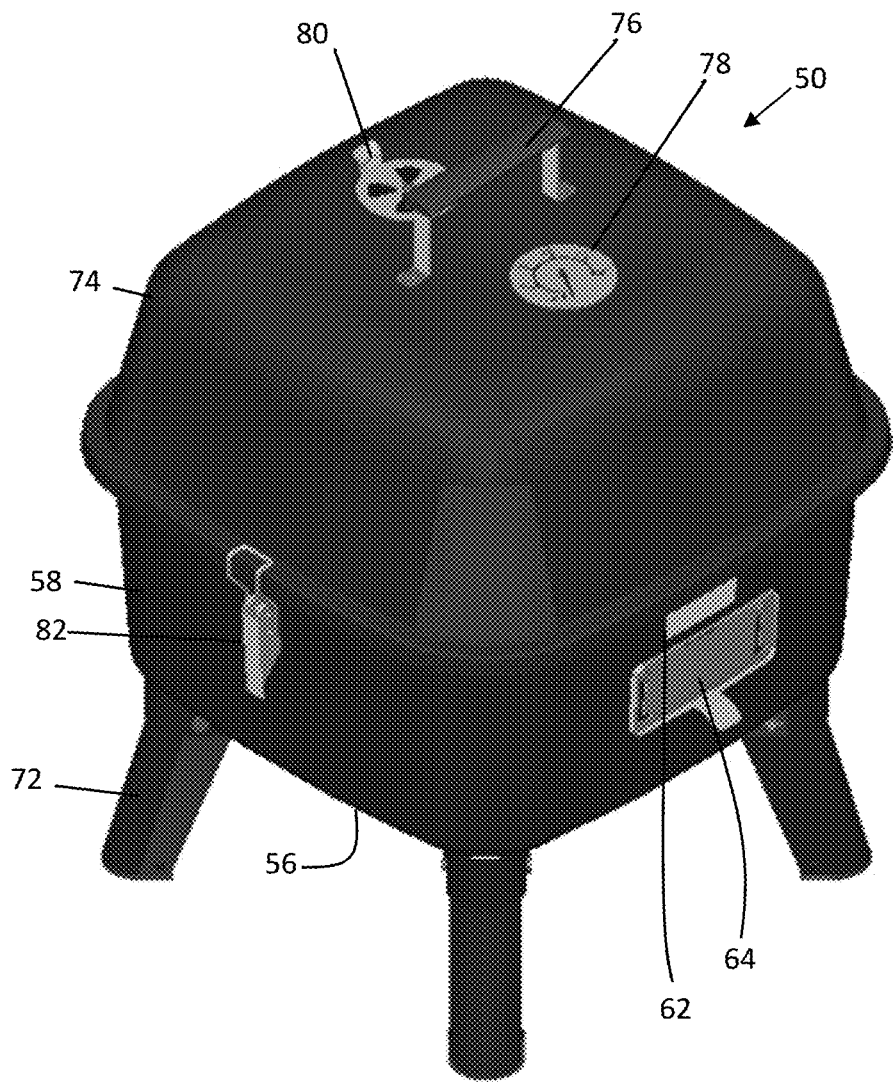
FIG. 16 is an alternate perspective view of the indoor outdoor portable grill of FIG. 1.
Figure 17:
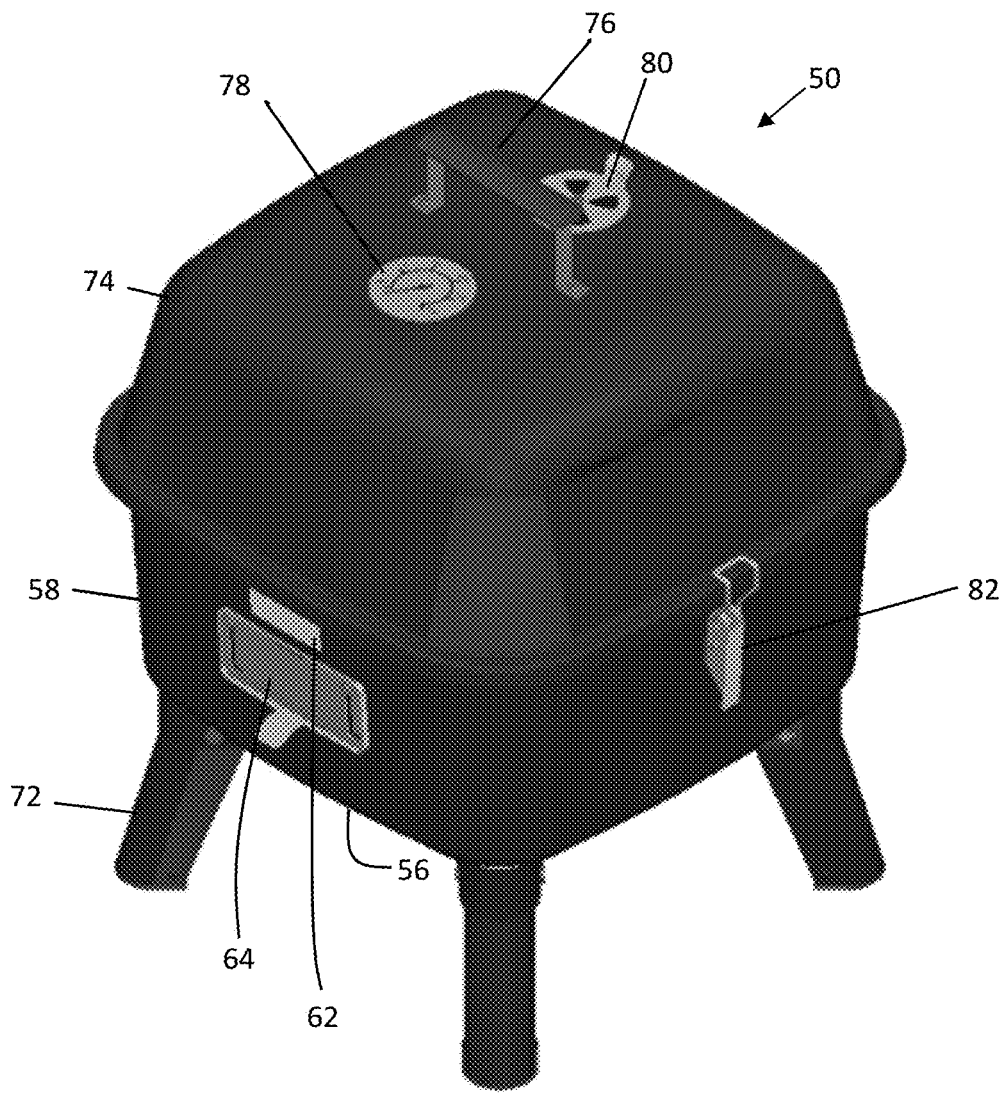
FIG. 17 is an alternate perspective view of the indoor outdoor portable grill of FIG. 1.
Figure 18:
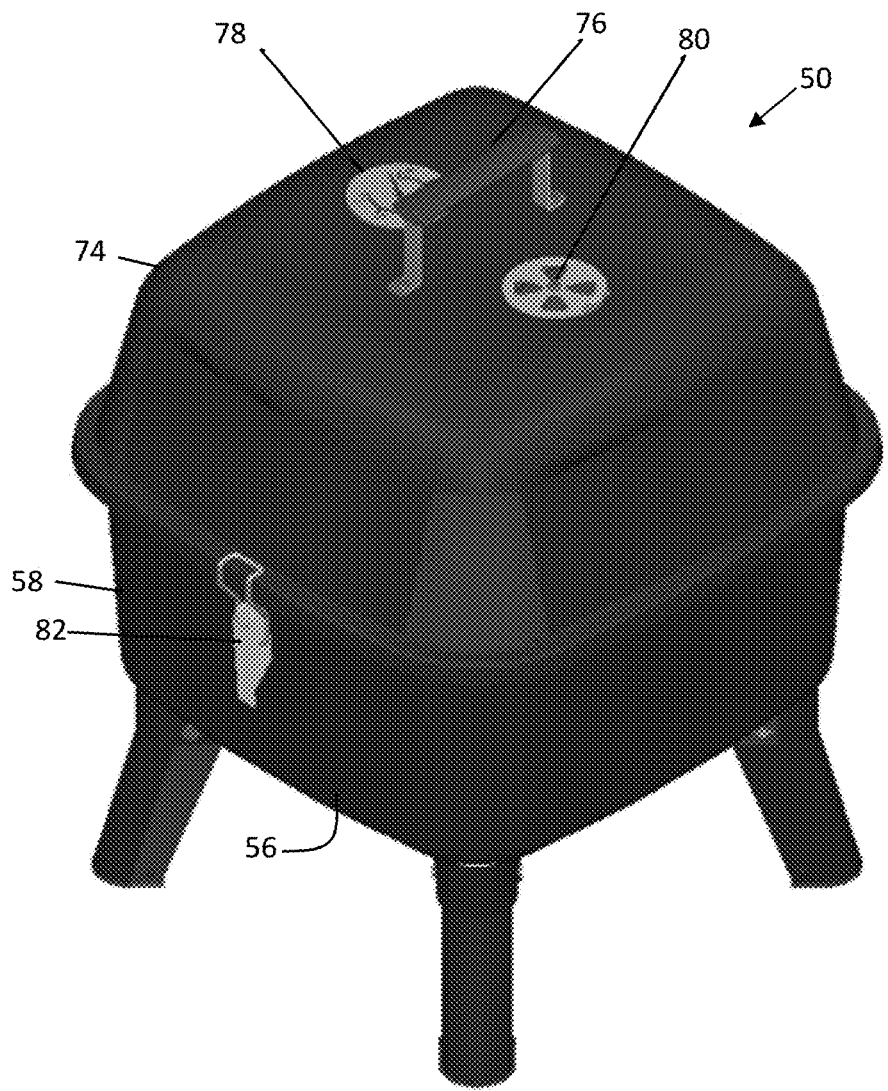
FIG. 18 is an alternate perspective view of the indoor outdoor portable grill of FIG. 1.
Figure 19:
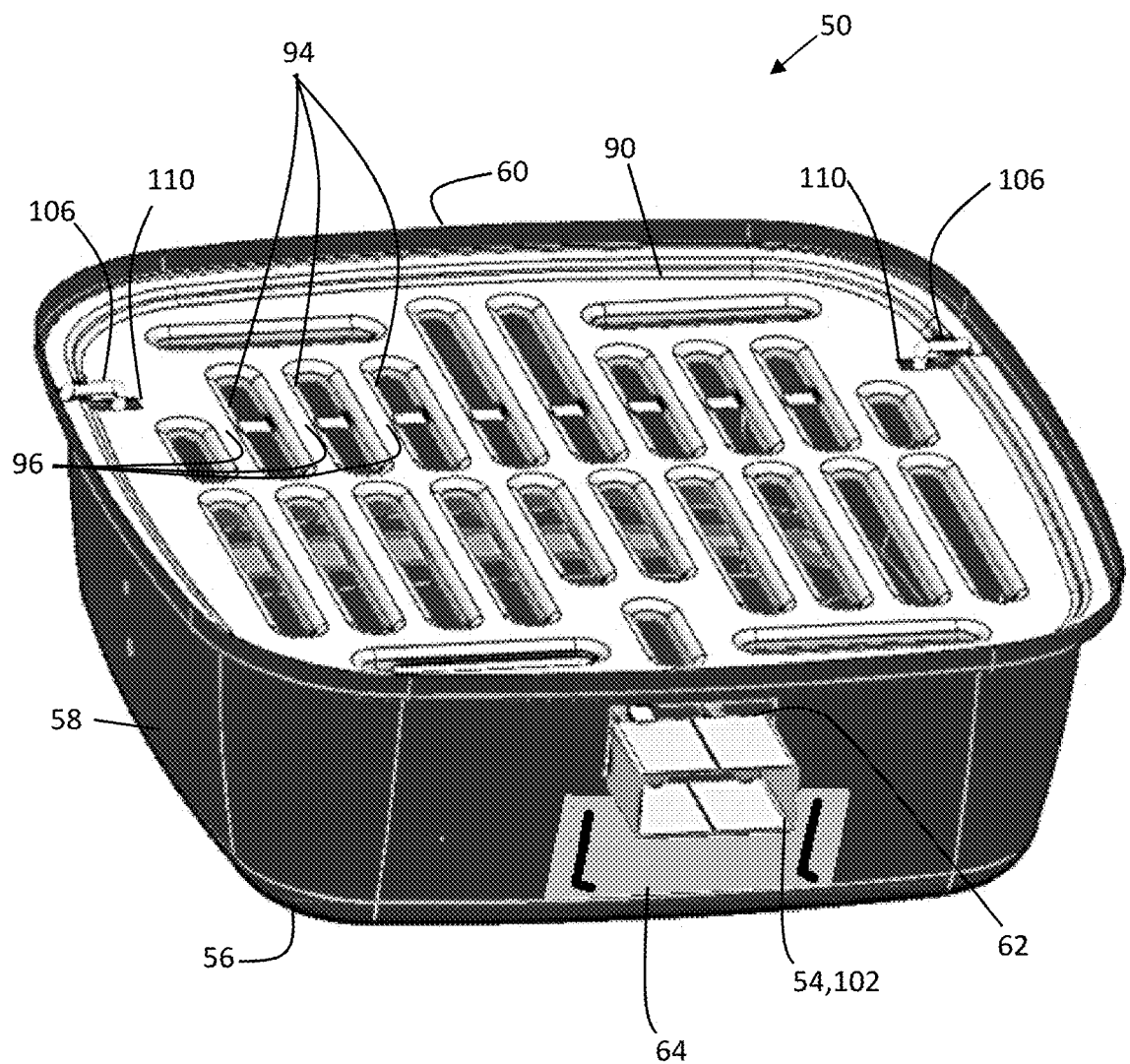
FIG. 19 is a perspective view of the indoor outdoor portable grill of FIG. 1 with a lid of the indoor outdoor portable grill removed to show additional detail of a cooking grate and a base for the indoor outdoor portable grill.
Figure 20:
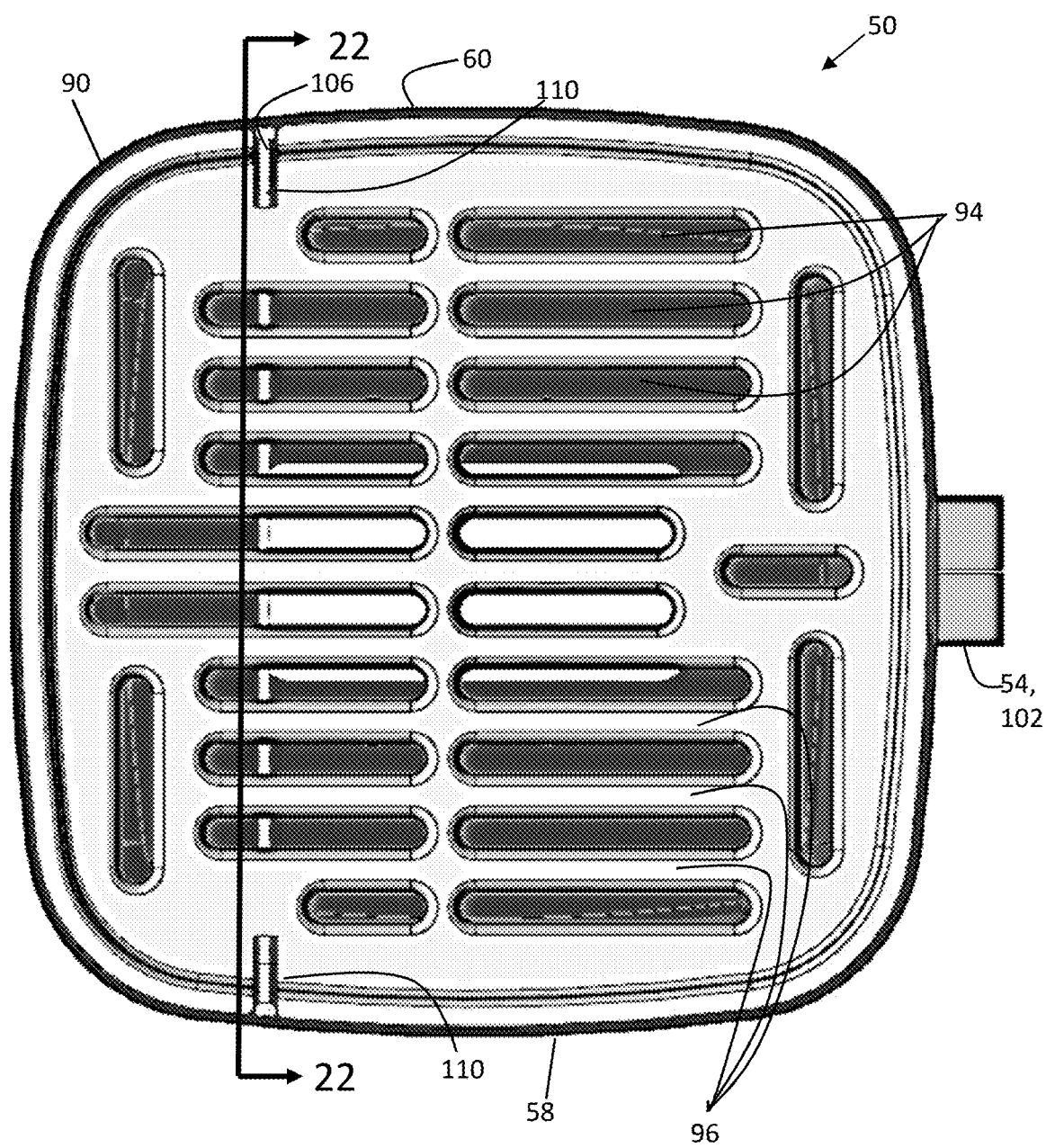
FIG. 20 is a top view of the cooking grate installed on the base of the indoor outdoor portable grill.

FIGS. 1-33 show an indoor outdoor portable grill 50 for use to cook a food product. The indoor outdoor portable grill 50 is envisioned for use in both an enclosed and open cooking environment. The portability of the indoor outdoor portable grill 50 allows the user to easily transfer the grill from one location to another to allow for quick and easy cooking in a variety of locations. The indoor outdoor portable grill is envisioned to be a designed with portability features. Thus, this portability allows the indoor outdoor portable grill to be easily transported in a vehicle for away from home cooking, and the indoor outdoor portable grill is designed to be a smaller size to allow for easy storage. Of course, the scale and size of the indoor outdoor portable grill can be adjusted based on a model design and the cooking surface area size desired by the user.

Providing for the ability to cook in both an interior and exterior environment, the indoor outdoor portable grill is designed to accept multiple sources of cooking elements. When the indoor outdoor portable grill 50 is employed for outdoor use, the indoor outdoor portable grill is designed to accept a solid combustible heating element 52 (FIG. 33) or material such as charcoal or wood to provide the cooking heat. In an indoor operational environment, the indoor outdoor portable grill 50 is designed to accept a non-combustible heating element 54 such as an electrically heated coil. The portability of the indoor outdoor portable grill allows for the interchangeability of the cooking elements depending on the environmental location of use. Thus, in an illustrative embodiment the indoor outdoor portable grill may be used outdoor for an afternoon picnic with charcoal cooked hamburgers, while later being used during a rainy evening indoors to grill a properly seared steak.

The indoor outdoor portable grill 50 has a base 56 with upstanding walls 58. The upstanding walls 58 define a hollow interior with an opening into the hollow interior defined by peripheral edges 60 of the upstanding walls. The base 56 is envisioned to be fabricated from a heat retaining material, such as solid sheet metal, although other materials, such as ceramic or the like may be used. The lower portion of the base 56 may present a flat surface which is able to receive a cooking element, such as a combustible material when the indoor outdoor portable grill is configured for outdoor use. The lower portion of the base 56 may not have any openings to allow for easy cleanup of burned combustible material resting on the lower portion after use. The upstanding walls 58 are configured to reflect and absorb the heat produced by the cooking element toward a cooking grate supported upon the peripheral edges of the upstanding walls. As viewed in the enclosed Figures, the upstanding walls 58 may form a substantially square shape for the base 56. However, other embodiments are envisioned where the upstanding walls may form a rectangular or a circle shape of the base. One or more upstanding walls may be provided.

As viewed in the enclosed Figures, the indoor outdoor portable grill 50 may have a plurality of openings 62 through at least one of the upstanding walls 58. One of the openings 62 (or passage) may be configured to accept and receive a portion of the electric cooking element 54 therethrough, for instance, when the indoor outdoor portable grill 50 is configured for use in an indoor environment. Power may be supplied from an outside source to the electrical cooking element 54 disposed through the passage 62 to heat the hollow interior of the base. If the indoor outdoor portable grill is configured to be used in an outdoor environment, the passage may be sealed by a movable plate 64. The movable plate 64 may be slidably affixed or attached to the upstanding wall 58 to prevent heat produced by the combustible material from escaping for optimal cooking. As shown in the drawing, the movable plate 64 has an "L" shaped slot 66 to allow vertical movement to block the passage 62 and horizontal movement to allow the plate to maintain position blocking the passage. Other slot configurations (e.g., "Z" shaped slots) may also be used to provide variable blocking of the plate. In this configuration the movable plate 64 may be positionable to variably block the passage 62 and act as a vent to control the temperature of the grill. The moveable plate 64 may also be assemblable or installed with the base 56 to block the passage to prevent heat produced by the combustible material from escaping for optimal cooking. Below the passage, other openings or apertures (not shown) may be provided to function as vents.

When the cooking session is complete and the base has cooled, a collection or drip tray 70 provided in a bottom portion or panel of the base 56 may be used to removed ashes and other refuse of the cooking process. Removing the burnt remains of the combustible material through the collection tray 70 allows the user an easy source of access that will not dirty or contaminate areas of the upstanding walls near the cooking grate. Particles of burnt combustible material contaminating the cooking grate would affect subsequent cooking sessions in a negative manner as such particles can adversely affect the taste of cooked food. Thus, the collection tray provides a means for removing this material that does not lead to contamination of the immediate cooking area.

Below the base 56 and attached to the base may be a plurality of legs 72. The plurality of legs may be attached to the base by a series of fasteners. As shown in the drawings, the plurality of legs 72 exist to stabilize the indoor outdoor portable grill during a cooking session or during storage. Further, by raising the base of the indoor outdoor portable grill, the legs provide clearance from any possible flammable material which may be present below the base during a cooking session. In some embodiments, the plurality of legs 72 may have a stabilizing position and a storage position. In the stabilizing position, the plurality of legs 72 are extended to support the grill during cooking. In the storage position, the plurality of legs may fold toward the interior of the indoor outdoor portable grill under the base 56 thereby decreasing the spatial requirements of storing the grill when it is not in use. The legs may be any size as desired and may be telescopic.

The indoor outdoor portable grill 50 may include a lid 74 configured to be removably attached to the base. The lid 74 may have a top portion with downward extending walls to create a volume under the lid when the lid is placed on the base 56. The lid 74 may be manufactured of the same material used to manufacture the base of the indoor outdoor portable grill. The lid 74 may be a heat retaining material, such as solid sheet metal, although other materials, such as ceramic or the like may be used. When placed on top of the base, the lid 74 is designed to match the shape of the upstanding walls 58. The lid 54 may have an outward protrusion circumnavigating the entirety of the end point of the downward extending walls. This outward protrusion is configured in an L-shape to provide a sealing lip when placed on top of the peripheral edge 60 of the base 56. When placed on top of the base, the sealing lip provides an adequate seal around the touching portions of the lid and the base such that heat produced by the cooking element or smoke from a combustible material may not escape. The overall design between the top portion of the lid and the downward extending walls produces a lid interior region. The lid interior region provides an interior space for cooking where rising heat or combustion gases or particles may collect and provide radiant heating. The lid interior region also provides adequate space so the heat produced by the cooking element can circulate effective to provide for even convection based cooking.

On the top portion of the lid 74, a handle 76 may be present. The handle 76 may be affixed to the top portion of the lid by a plurality of fasteners. In other embodiments the handle 76 may be represented with an alternative design and affixed by a single fastener. The handle 76 may be manufactured of a heat resistant material such that indirect heat absorbed by the lid will not travel up and through the handle to heat the handle.

The lid may also contain a temperature gauge 78 affixed on the top portion. The temperature gauge 78 is configured to contain a temperature measurement device which passes through the top portion of the lid 74, and is operable to measure the temperature of the air and gases contained within the lid interior region. The temperature gauge 78 provides the user a visual indication of temperature scale. Thus when the indoor outdoor portable grill is in use, a user can determine the temperature of the interior of the indoor outdoor portable grill and adjust his/her cooking technique accordingly.

Additionally, the lid may have a vent 80 affixed on and through the top portion. The vent 80 is movable to position the vent between an open and a closed position. The moveable nature of the vent 80 allows the user to make slight adjustments to the vent depending on how open or closed the user wished the vent to be. When placed in the closed position, the vent 80 will allow trapped heat, combustion gases, and combustion particles to remain within the interior of the indoor outdoor portable grill to both flavor the cooked food and promote an increased rate of cooking, and also allow stopping the combustion process over time. In contrast, when the vent 80 is placed in an open position, the vent will allow heat, combustion gases, and combustion particles the ability to leave the interior of the indoor outdoor portable grill to both remove heat and excess flavoring from the cooked food and also increase the combustion process. The vent 80 in the open position may also allow outside air to enter the interior of the indoor outdoor portable grill to promote circulation of the heated air and to aid in fueling combustible material if the indoor outdoor portable grill is in use outdoors.

The protrusion of the lid which produces the sealing lip is configured to accept a latching mechanism 82. The latching mechanism 82 can be attached to the outside of at least one of the upstanding walls of the base. In other non-limiting embodiments, a plurality of latching mechanisms may be present. In an unlatched position, the latching mechanism will not secure the lid to the top of the base. However, in the latched position, the latching mechanism will securely hold the lid on top of the base. The latching mechanism can be used to help the sealing lip provide an adequate seal to keep heat, combustion gases, and combustion particles within both the lid interior region and the hollow interior of the base. Additionally, when in the latched position, the latching mechanism provides for easy portability as a user can grasp the handle of the lid to transport the entire indoor outdoor portable grill to a location of his/her choosing.

As seen in FIGS. 19-30, a cooking grate 90 is present within the interior of the indoor outdoor portable grill. The cooking grate 90 is supported by the upstanding walls 58 of the base 56. The cooking grate 90 may have a peripheral groove 92 (FIG. 25) which may be received on the peripheral edge 60 of the upstanding wall or an edge adjacent to the peripheral edge of the upstanding wall. The cooking grate may also be supported by tabs (not shown) projecting into the hollow interior of the base adjacent to the peripheral edge of the upstanding wall. The cooking grate 90 may be manufactured by any type of suitable cooking material, but preferably a metal material having heat retention properties. The cooking grate 90 is preferably not permanently attached to the base of the indoor outdoor portable grill allowing the cooking grate to be easily removed for both cleaning purposes and for placement of combustible material onto the lower portion of the base when the indoor outdoor portable grill is to be used outdoors. A plurality of slits 94 are located on the cooking grate 90 thereby defining ribs 96 of the cooking grate to support items to be cooked. The plurality of ribs 96 are designed with a downward slope to provide for removal of food particles and grease given off as the food cooks. The plurality of ribs 96 may be designed in such a manner that provides both adequate cooking surface area for food placed on the ribs of the cooking grate, as well as to allowing heated air to flow up though the slits 94 and around the food for convection cooking.

Figure 28:
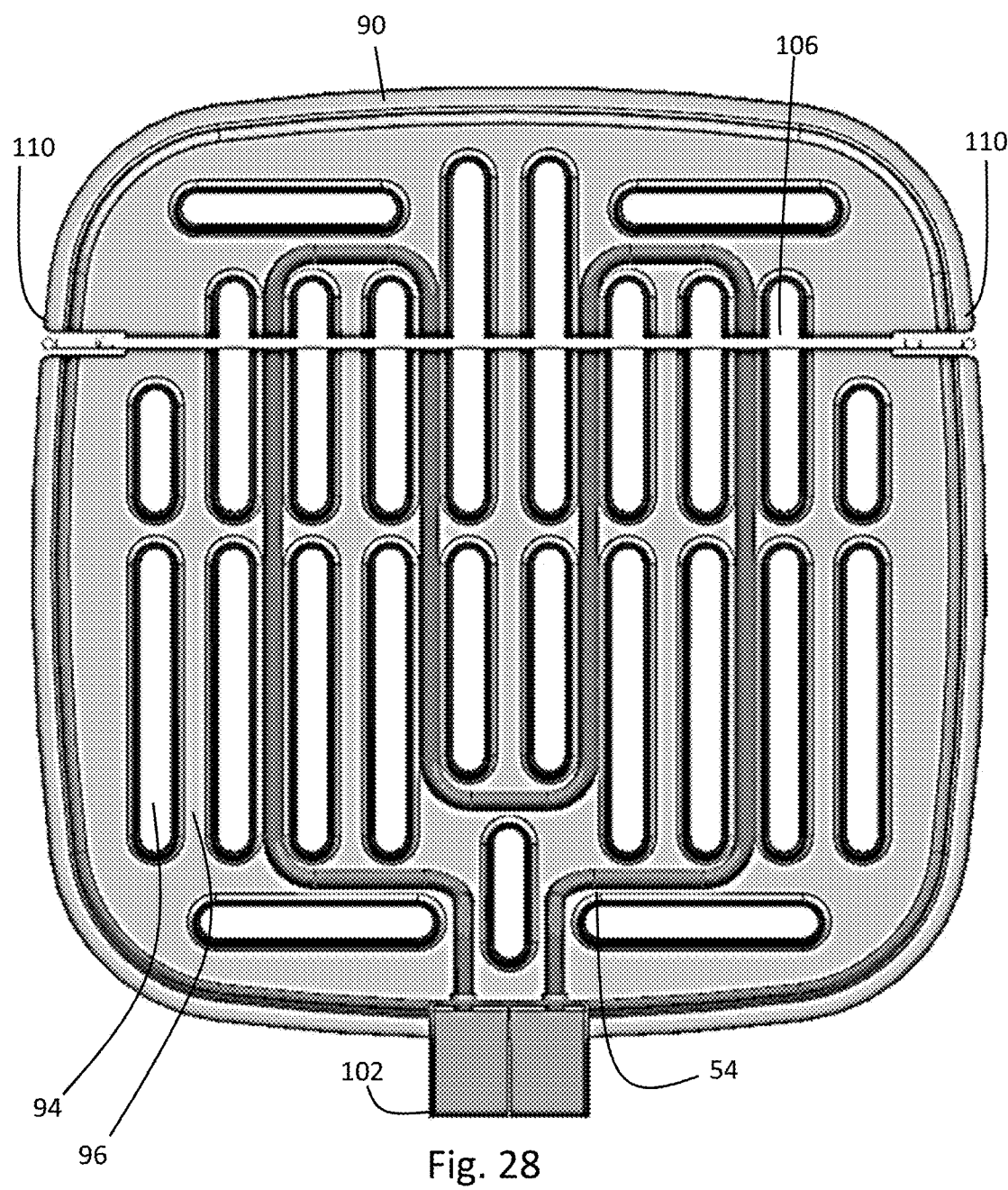
FIG. 28 is a bottom view of the cooking element and cooking grate.
Figure 29:
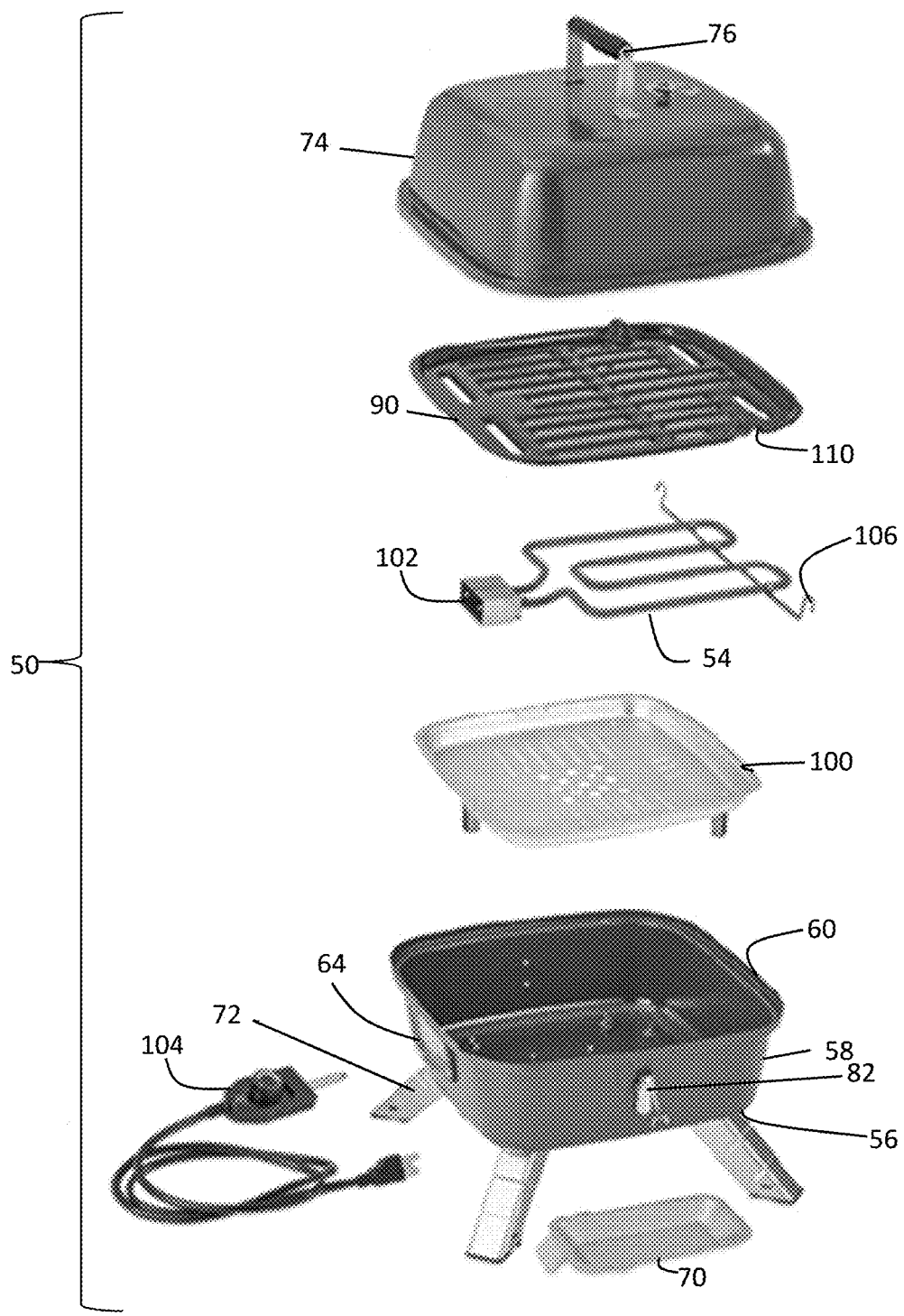
FIG. 29 is an exploded view of the indoor outdoor portable grill of FIG. 1.
Figure 30:
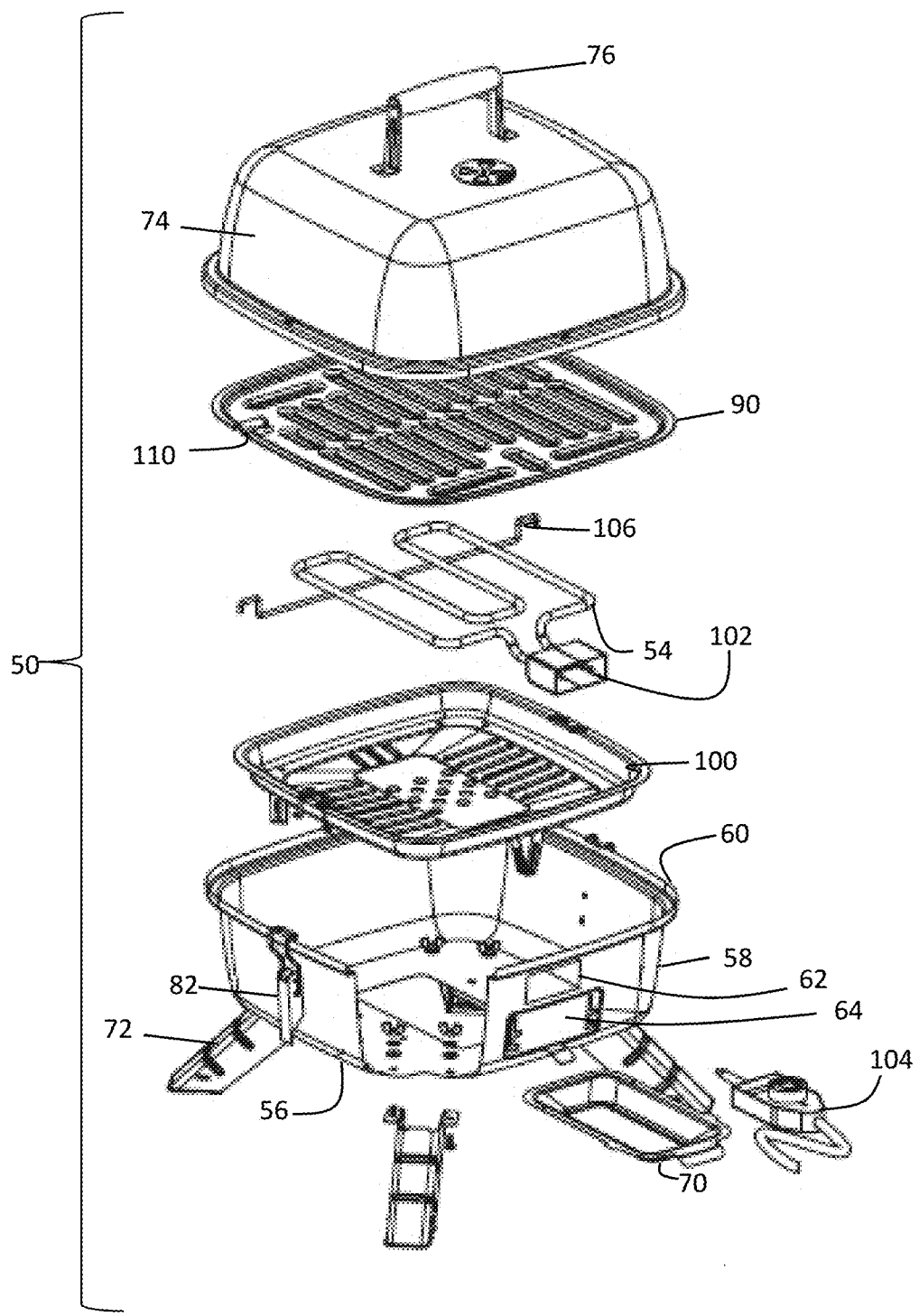
FIG. 30 is another exploded view of the indoor outdoor portable grill of FIG. 1.

The cooking grate 90 is designed to be utilized in both the indoor and outdoor operations of the grill. In outdoor operation, the plurality of ribs 96 allows for grease or other food particles to flow off the food and downward towards the combustion material. Contact of food particles or grease with the combustion material provides ideal smoke flavor and taste associated with the outdoor grilling experience. When using the electrical cooking element 54, to avoid contact of the food particles and grease run off from cooking operations with the cooking element, the plurality of slits 94 in the cooking grate 90 are arranged so that the ribs 96 are in register and entirely encompass the electric cooking element. Thus, the slits 94 are not arranged in register with the cooking element 54. As best shown in FIG. 28, the runs and loops of the cooking element 54 are aligned with the ribs 96 and not the slits 94. Thus, the ribs 96 of the cooking grate 90 provide protection for the cooking element 54 from food particles and grease run-off from cooking operations when the indoor outdoor portable grill is to be used indoors. Therefore, when cooking food indoors, the grease and food particles will flow and drip to the bottom of the base and not contact the electrical cooking element.

Figure 21:
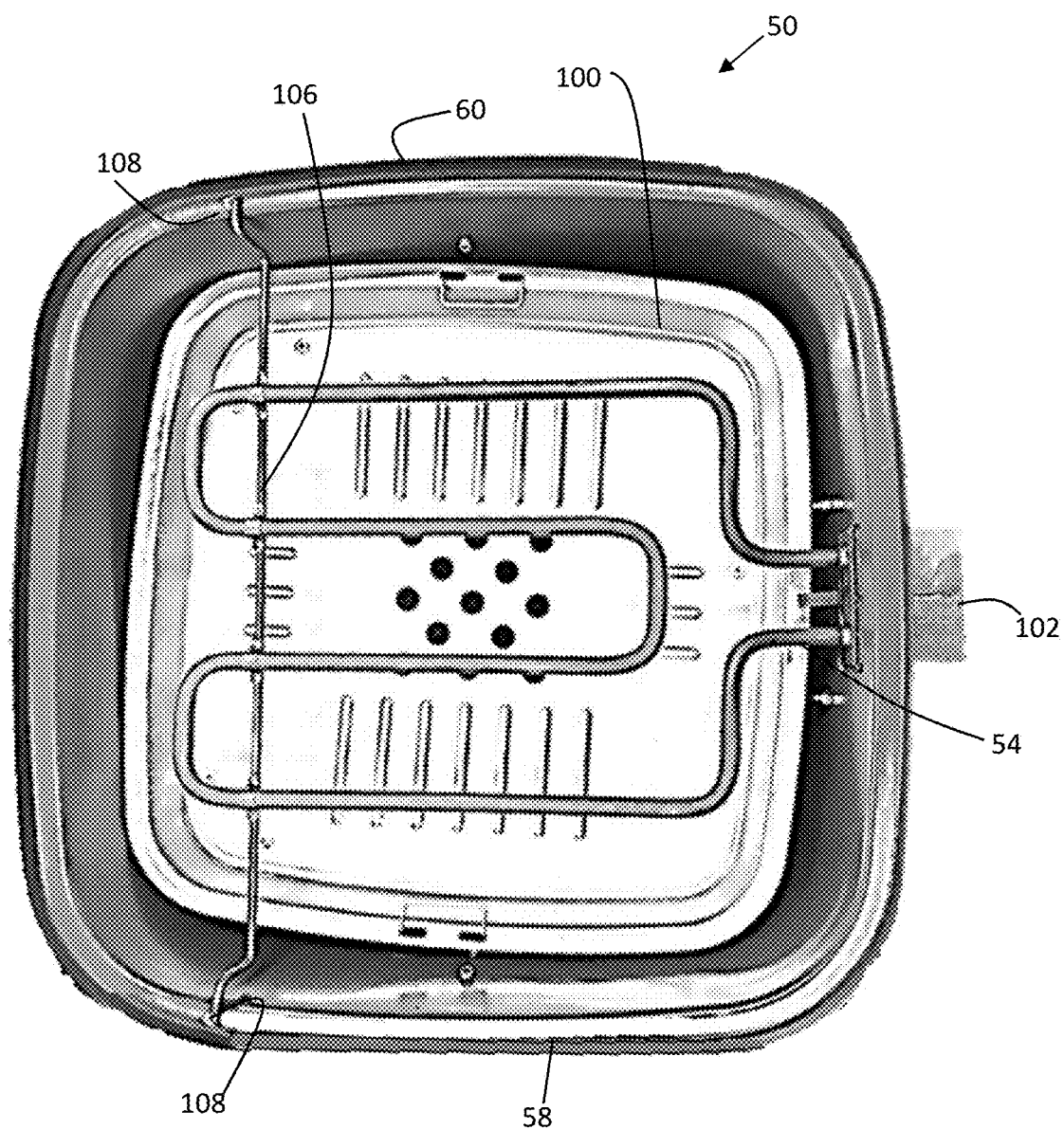
FIG. 21 is a top view of the base of FIG. 20 with the cooking grate removed to show additional detail of the cooking element and drip tray installed within the base of the indoor outdoor portable grill.
Figure 22:
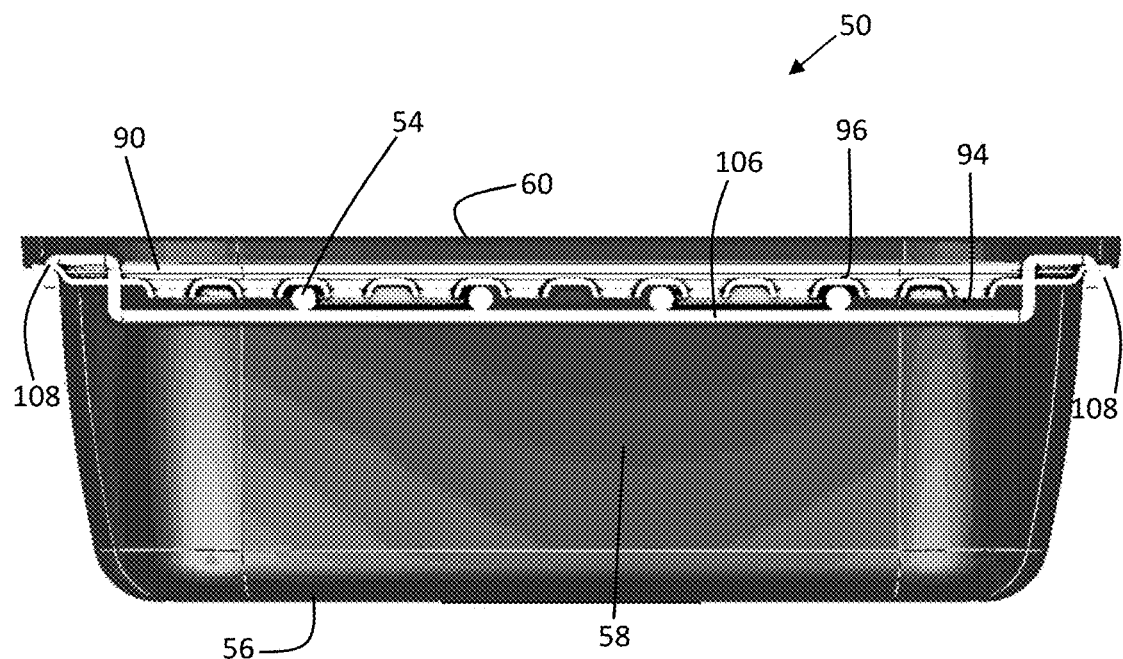
FIG. 22 is a cross-sectional view taken across lines 22-22 of FIG. 20.
Figure 23:
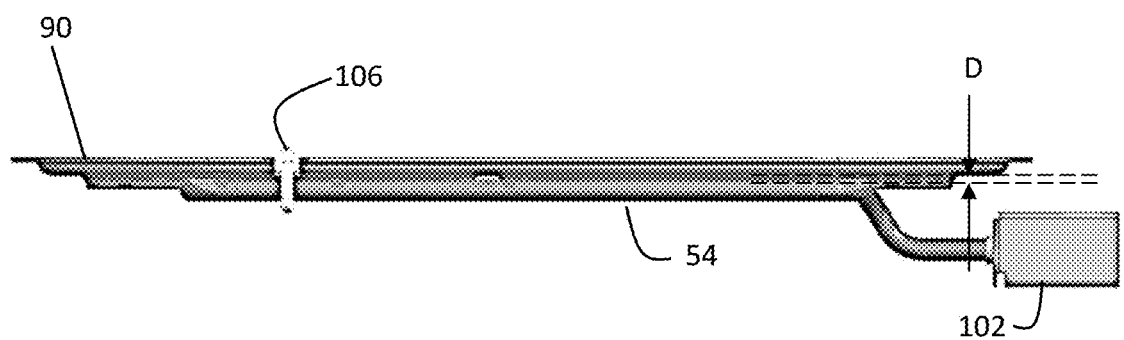
FIG. 23 is a side view of the grate and cooking element with the base of the indoor outdoor portable grill removed for ease of illustration.
Figure 24:
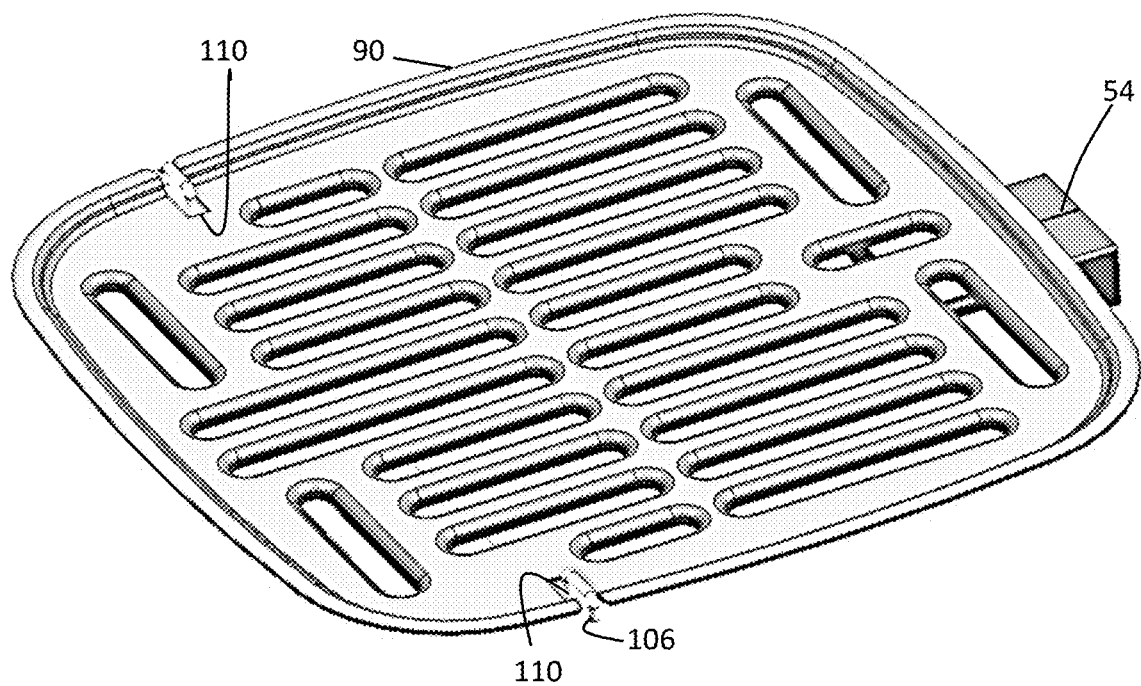
FIG. 24 is a perspective view of the cooking grate with the cooking element positioned under the grate.
Figure 25:
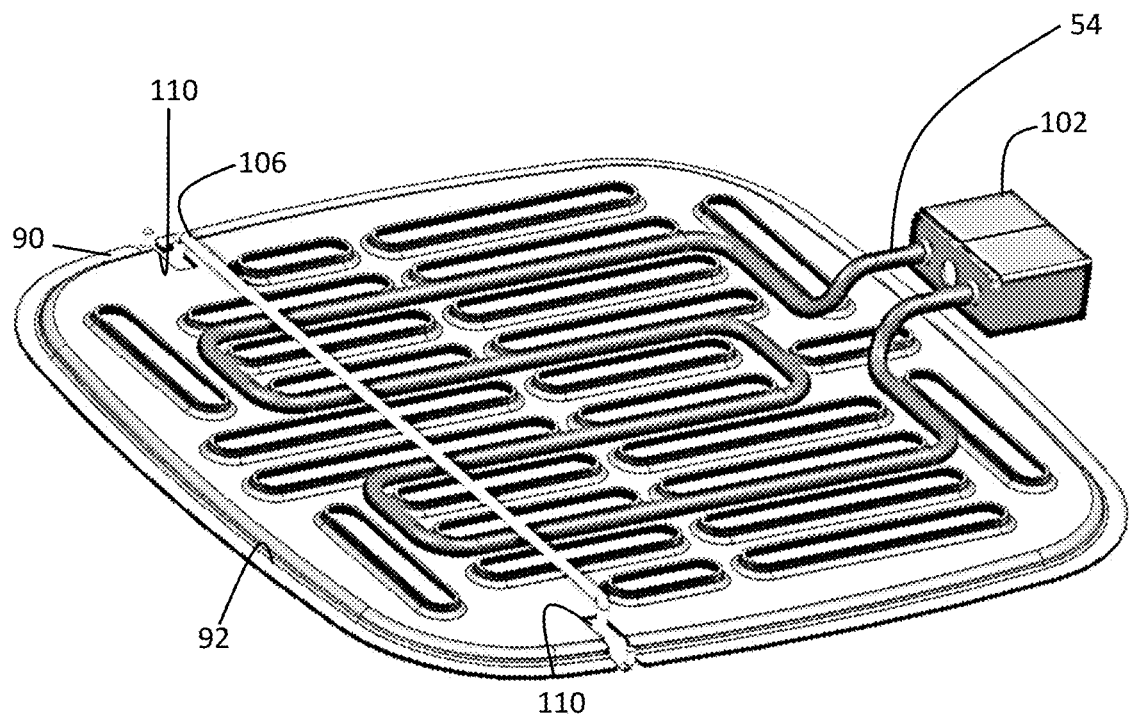
FIG. 25 is a perspective view of the bottom of the cooking grate showing additional detail of the cooking element.
Figure 26:
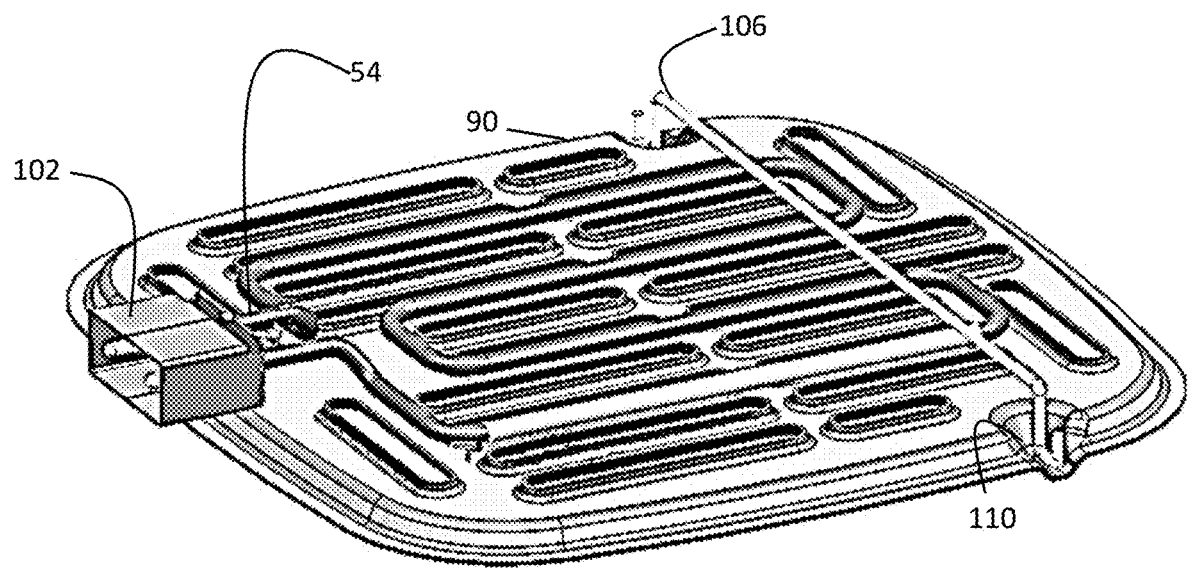
FIG. 26 is another perspective view of the bottom of the cooking grate showing additional detail of the cooking element and a preferred dimension of spacing between the cooking grate and the cooking element.
Figure 27:
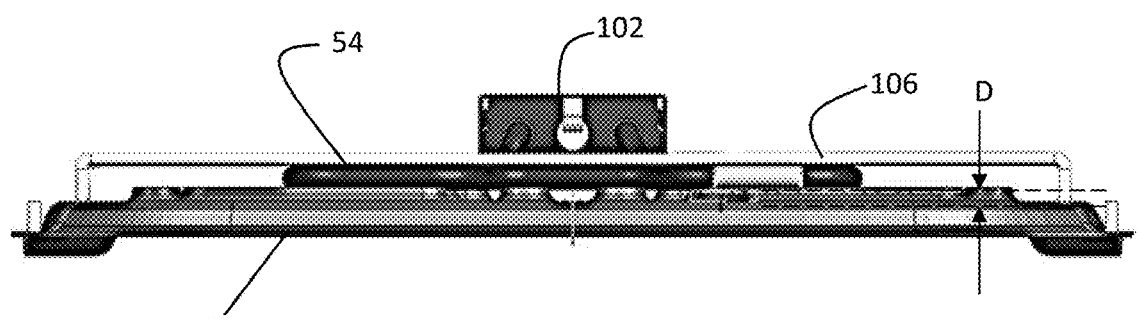
FIG. 27 is a front view of the cooking grate in an inverted orientation with the cooking element positioned above the cooking grate and showing a preferred dimension of spacing between the cooking grate and the cooking element.

As seen in FIG. 21, a drip pan 100 may be provided and have a dual use in that it may also be used as a smoking pan in some embodiments of the indoor outdoor portable grill. The drip pan 100 is positioned below the cooking grate 90 and electronic heating element 54 and may rest on the bottom of the base 56. In an indoor cooking environment, the drip pan 100 may rest on the base to collect the food particles and grease which fall through the plurality of slits and into the drip pan. For indoor cooking, the drip pan 100 provides an easy clean up alternative for the user so that scrubbing of the interior of the base 56 and upstanding walls 58 is not needed after an indoor cooking session.

In an outdoor use configuration, the drip or collection pan 100 allows for the removal of ashes and other products of combustion and cooking process. In an outdoor cooking session, the drip pan 100 can be placed inside the interior of the base on top of the combustible material, most preferably charcoal. Run off from the cooked food will then collect in the drip pan and not ignite as to char the cooked food. Additionally, the drip pan 100 can be used as a smoking pan in an outdoor cooking session. Smoking material, such as wood chips, may be placed into the drip pan 100 and placed on top of the combustible material. Indirect heat from the combustible material 52 will allow the smoking material to smoke offering up the smoky flavor the user desires in cooking his/her food. When the cooking session ends, the cooled drip pan 100 can be easily removed from the interior of the indoor outdoor portable grill by a plurality of handles present on the sides of the drip pan. Easy cleanup of both the drip pan and indoor outdoor portable grill can then occur.

FIGS. 25-30 provide additional detail of the electronic heating element 54. The electronic heating element 54 is contained within the hollow interior of the base 56 and positioned through the upper opening or aperture 62 present in one of the upstanding walls 58. The electronic heating element 54 consists of an electric heating element affixed to a mounting socket 102. The mounting socket is configured to accept a plug 104 to provide power to the electronic heating element from an outside source. When indoor cooking is desired, the mounting socket 102 may be placed within the passage 62 of the upstanding wall. In some embodiments, the mounting socket 102 may have a circumnavigated plate which may be pushed up against and flush with the interior side of the passage 62 of the upstanding wall 58. In other embodiments, the mounting socket 120 may be attached to the upper opening or aperture by a clasping or gripping mechanism. For instance, the socket 102 and/or passage 62 may have fingers which are biased in a manner to engage the passage or upstanding wall, as applicable. In yet another embodiment, the mounting socket 102 may solely rest within the passage 62. The electronic heating element 54 is removable such that a proper outdoor grilling experience can be achieved. However, other embodiments are possible where the electronic heating element 54 is permanently mounted to the upstanding wall 58 by the mounting socket 102. In such a configuration, the electronic heating element 54 will also be present within the indoor outdoor portable grill during outside cooking sessions.

The electric heating element 54 projects from one side of the mounting socket 102, and on the opposite socket end, a plurality of prongs exist which may fit into the plug 104. The plurality of prongs are fabricated by conductive material able to receive the flow of electrical current and transfer the received electrical current into the electric heating element 54. The plug 104 is configured to accept power in the form of alternating current from a commercial outlet. In other embodiments, for instance, where the grill is configured to operate on electricity outdoors, the plug may be configured to receive power from a direct current source or another non-conventional means of power such as but not limited to a vehicle's cigarette or charging port, or a power inverter or generator. The plug 104 may have a temperature adjustment device contained within its internal circuitry. The temperature adjustment device will vary the flow of current traveling through the electric heating element 54 to thereby either increase or decrease the heat produced by the electric heating element. The temperature adjustment device may be attached to a rotatable dial with a visualized representation of possible temperatures. There may also exist an off position on the dial of the plug 104 indicating to the user that no power is flowing to the electric heating element 54. A user may manually adjust the dial by rotation to the desired temperature. Accordingly, the temperature adjustment device will response to the user input to adjust the corresponding flow of current. Additionally, the plug 104 may contain an indication light. The indication light provides the user a visual indication that current is flowing into the electric heating element thereby heating the interior of the indoor outdoor portable grill. In some operative embodiments, the indication light may cycle between an ON and an OFF state when current is supplied to maintain the desired temperature selected by the user. When the dial is positioned in the OFF position, the indication light will turn off.

The electric heating element 54 is designed to follow the contour of the cooking grate 90 and be spaced below from the cooking grate so that any excess food particles or grease will fall off through the plurality of slits 94 in the cooking grate and not contact the electric heating element directly. Further, the electric heating element 54 is designed in a curvilinear, snaking shape, although other configurations are possible and envisioned. When heated, the design of the electric heating element 54 is such that heat emanating from the coil will evenly heat both the ambient air and the cooking grate 90 as to not produce a localized hot spot.

Opposite the mounting socket 102, the electric heating element 54 may be held in place by a mounting bar 106. The mounting bar 106 is positioned to support the heavier portions of the electric heating element 54 in a constant and stable position near a distal end of cooking grate opposite the passage 62. Ends of the mounting bar 106 may attach to notches 108 formed on the peripheral edge 60 on opposite sides of the upstanding wall 58. The weight of the electric heating element 54 resting on the mounting bar 106 will securely position the mounting bar in place. The grate 90 may have cut-outs 110 to accommodate the mounting bar 106 and its connection with the notches 108 in the peripheral edge 60 of the upstanding wall 58.

The mounting bar 106 may also stabilize the electric heating element at a set distance from the cooking grate. Through extensive testing and experimentation, the inventors discovered that it is ideal for the electric heating element 54 to remain spaced from the cooking grate 90. Through research, the inventors found that placing the electric heating element 54 at a distance D of between about 3.0 mm and about 4.0 mm from the cooking grate 90 provides satisfactory results. Maintaining the distance D of about 3.5 mm from the cooking grate 90 provided the most ideal cooking results. Placing the electric heating element 54 at such a close, yet non-contacting position relative to the grate 90, provides significant advantages not realized with other grills. In such a non-contacting position, the electric heating element 54 of the indoor outdoor portable grill is adequately protected from food particles and grease runoff by the ribs 96 of the grate 90. Further, placing the electric heating element 54 in such a position allows for inclusively optimal application of radiation, induction, and convection cooking techniques. At the distance of between about 3.0 mm and about 4.0 mm, the electric heating element 54 is proximate enough to provide inductive heating directly to the cooking grate 90 allowing for a proper and ideal sear of food during cooking. Placing the electric heating element 54 at the distance of between about 3.0 mm and about 4.0 mm below the cooking grate 90 allows the electric heating element to be proximate enough to the cooking food so that the radiation heat disseminated by the electric heating element can contact the food portions which cover the ribs 96 adjacent to the slits 94 near the electric heating element. Furthermore, placing the electric heating element 54 at a distance of between about 3.0 mm and about 4.0 mm below and not in contact with the cooking grate 90, increases the surface area of the electric heating element contacting the ambient air. This contact heats the surrounding air facilitating air movement to provide efficient and effective convection based cooking. Utilizing each radiation, induction, and convection cooking techniques, the electric heating element 54 provides an even and effortless cooking effect to food placed on the cooking grate during indoor cooking sessions.

Figure 31:
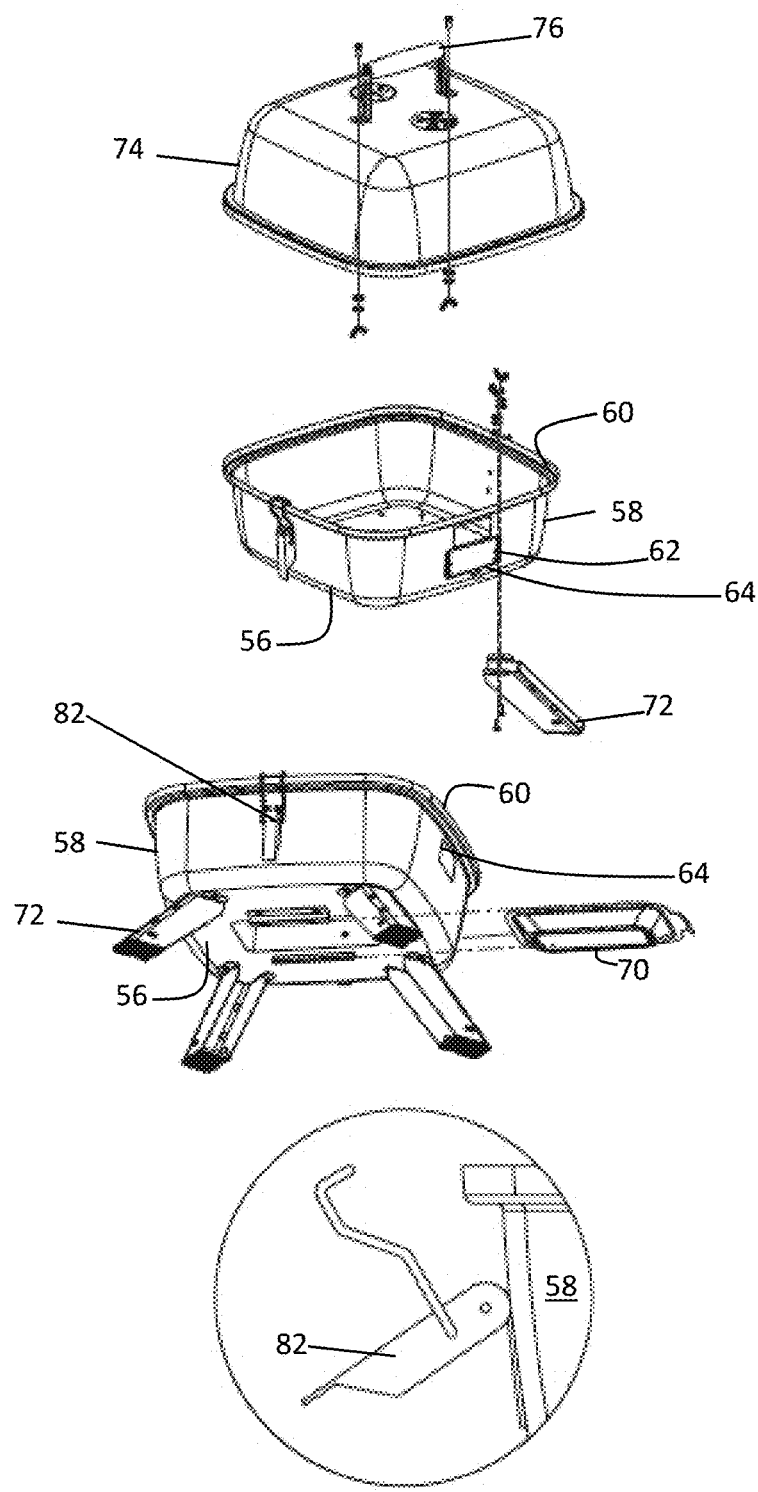
FIG. 31 is an illustrated process flow for use of the indoor outdoor portable grill of FIG. 1.

As shown in FIG. 31, a method of using the indoor outdoor portable grill may include the following: (i) to assemble the lid, one may align the handle with the holes in the lid, insert a screw through the tops of each hole and place a silicone washer over the screws; the handle may be secured to the lid with wing nuts; (ii) to assemble each leg, one may align the leg with the holes in the body and insert a screw through the bottoms of each hole and place a silicone washer and then a metal washer over the screws and secure the leg with wing nuts; (iii) one may next insert the drip tray by aligning the tray with the tracks on the bottom of the grill body and pushing the tray until it is fully beneath the opening at the bottom of the grill body; and (iv) to secure the locking latch, one may pull up on the bottom portion of the latch, position the top portion of the latch over the rim of the lid, and push down the bottom portion of the locking latch.

Figure 32:
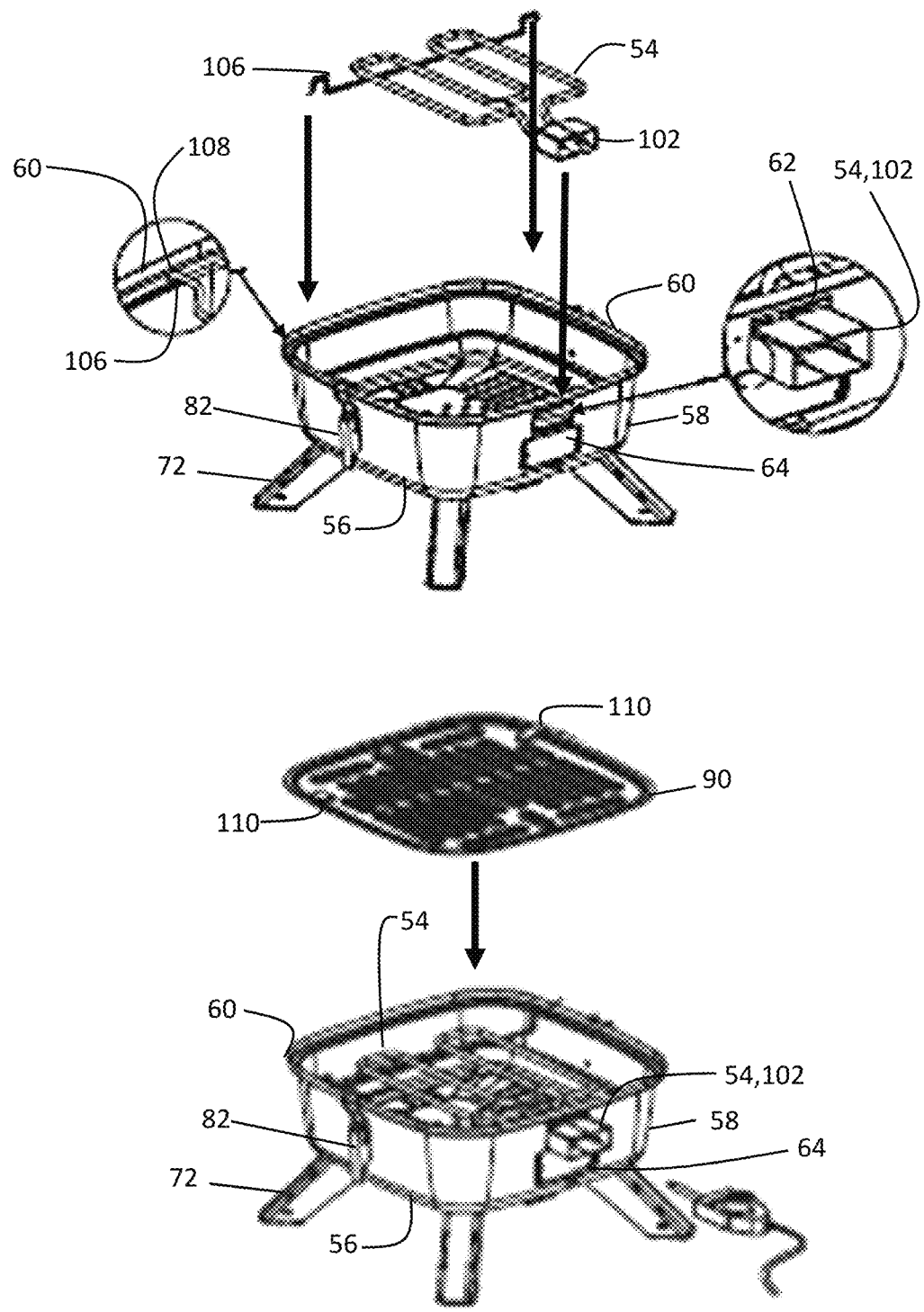
FIG. 32 is an additional illustrated process flow for use of the indoor outdoor portable grill of FIG. 1.

As shown in FIG. 32, a method of using the indoor outdoor portable grill may include the following: (i) to install the electric heating element, for instance, for indoor use, one may move the sliding cover on the side of the grill body down; (ii) insert the connection plug of the electric heating element from the inside through the opening in the grill body formed by the downward sliding of the sliding cover on the side of the grill body; (iii) insert the support hooks of the electric heating element into the holes in the top of the grill body; (iv) attach the control unit probe into the electric heating element connection; (v) place the grill grate over the electric heating element and aligning the support hooks with cut-outs in the grill grate; (vi) one may then turn the temperature control dial to a desired heat setting and place the lid on the grill body over the grill grate to preheat the grill; and (vii) when the grill reaches a desired temperature, cooking may commence as desired.

Figure 33:
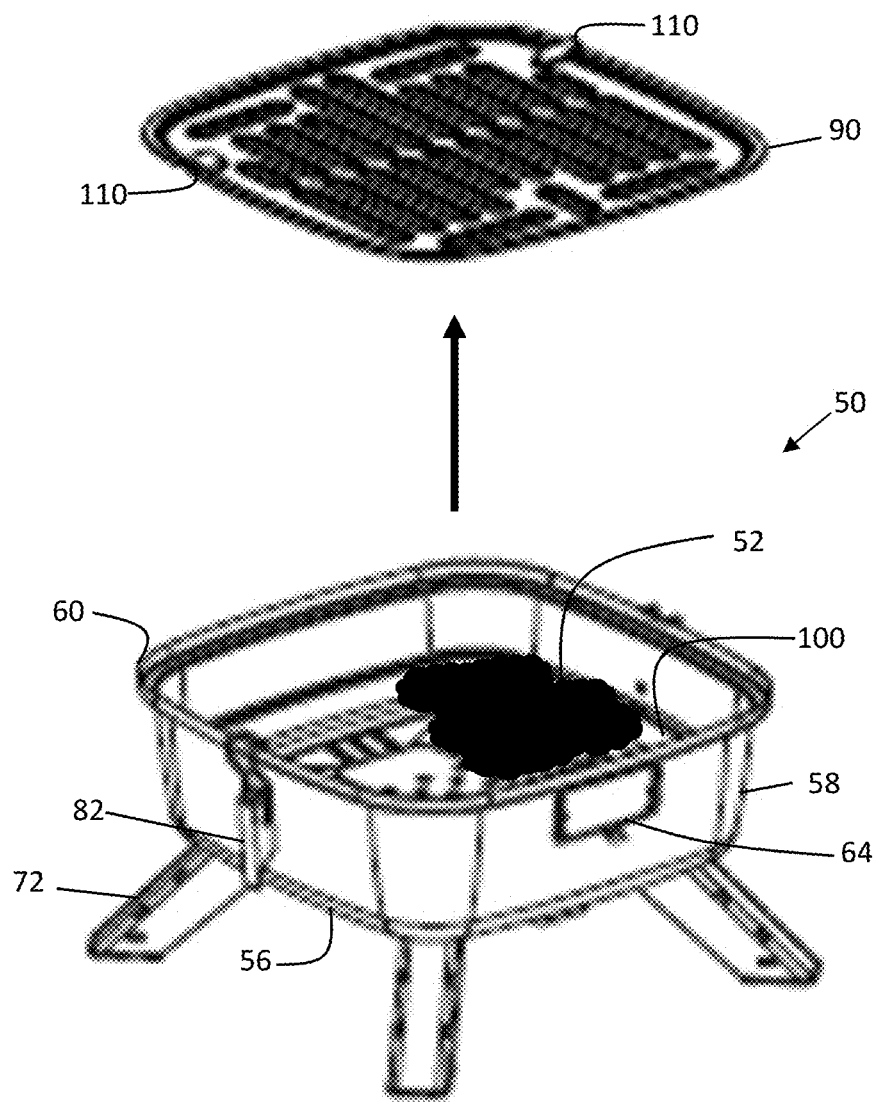
FIG. 33 is an additional illustrated process flow for use of the indoor outdoor portable grill of FIG. 1.

As shown in FIG. 33, a method of using the indoor outdoor portable grill for outdoor charcoal use may include the following: (i) remove the lid and grill grate, and remove the electric heating element and plug, if installed; (ii) position the metal cover over the plug hole in the base of the grill body; (iii) place the charcoal tray in the bottom of the grill; (iv) place charcoal in the interior of the grill body and light the charcoal; (v) when the charcoal is sufficiently ignited, spread the charcoal out in the base of the interior of the grill body to evenly disperse the heat; (vi) place the grill grate on the grill body and place the lid on the grill body over the grill grate to preheat the grill; (vii) adjust the vents on the lid and grill body to maintain ignition of the charcoal; and (viii) when the grill reaches a desired temperature, cooking may commence as desired. Cooking may be accomplished by direct heating methods. When cooking is complete, to extinguish the charcoal, the lid may be placed on the grill body over the grill grate, and the vents may be closed until the charcoal is completely extinguished and the grill is cooled.

The disclosed embodiments were chosen and described in order to best explain the principles and its practical application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A cooking appliance comprising:
   a cooking grate having slits;
   a base having upstanding walls defining a hollow interior with an opening into the hollow interior defined by peripheral edges of the upstanding walls, the base being configured to support the cooking grate adjacent to the opening with the slits of the grate communicating with the hollow interior of the base when the grate is assembled with the base, one of the upstanding walls having a passage into the hollow interior, the passage having a closure, the closure being moveable between a closed position in which access through the passage into the hollow interior of the base is blocked and an open position in which access through the passage is provided;
   a lid configured to be removably attached to the base and allowing access to the cooking grate; and
   an electrical cooking element removably attachable to the base at the passage, the electrical cooking element being spaced from the grate and positioned in the hollow interior of the base.

2. The cooking appliance of claim 1 wherein the cooking element extends into the hollow interior of the base in a spaced relationship with the cooking grate in areas not aligned with the slits.

3. The cooking appliance of claim 2, wherein the spacing between the electrical cooking element and the grate is between about 3 mm and about 4 mm.

4. The cooking appliance of claim 3 wherein the spacing between the electrical cooking element and the grade is about 3.5 mm.

5. The cooking appliance of claim 1 wherein the cooking element has a socket that receives a power cord.

6. The cooking appliance of claim 5 wherein the socket is positioned exterior to the base when the cooking grate is assembled with the base.

7. The cooking appliance of claim 5 wherein the socket has fingers which are biased in a manner to engage the passage.

8. The cooking appliance of claim 1 wherein the base and the lid have at least one vent opening.

9. The cooking appliance of claim 1 wherein the passage closure is movable to the open position when assembling the electrical cooking element with the base.

10. The cooking appliance of claim 1 wherein the passage closure is movable to the closed position when disassembling the electrical cooking element with the base.

11. A cooking appliance comprising:
    a cooking grate having slits defining ribs of the grate;
    a base having an upstanding wall defining a hollow interior with an opening into the hollow interior defined by a peripheral edge of the upstanding wall, the base being configured to support a cooking grate adjacent to the opening;
    a lid configured to be removably attached to the base and allowing access to the cooking grate;
    an electrical cooking element being spaced from the grate and positioned in the hollow interior of the base;
    a passage formed in one of the upstanding walls and allowing communication through the upstanding wall into the hollow interior, the passage having a closure being moveable between a closed position and an open position, wherein in the open position the passage is configured to receive the cooking element and support the cooking element in the hollow interior of the base to enable cooking with electricity via the cooking element, and wherein in the closed position the closure of the passage at least partially blocks access through the passage into the hollow interior of the base to enable cooking with a combustible solid material deposited in the hollow interior of the base without the cooking element.

12. The cooking appliance of claim 11 wherein the cooking element extends into the hollow interior of the base in a spaced relationship with the cooking grate aligned with the ribs and not in register with the slits.

13. The cooking appliance of claim 12, wherein the spacing between the electrical cooking element and the grate is between about 3 mm and about 4 mm.

14. The cooking appliance of claim 12 wherein the spacing between the electrical cooking element and the grade is about 3.5 mm.

15. The cooking appliance of claim 11 wherein the cooking element has a socket that receives a power cord.

16. The cooking appliance of claim 15 wherein the socket is positioned exterior to the base when the cooking grate is assembled with the base.

17. The cooking appliance of claim 15 wherein the socket has fingers which are biased in a manner to engage the passage.

18. The cooking appliance of claim 17 wherein the base and the lid have at least one vent opening.

19. The cooking appliance of claim 11 wherein the passage closure is movable to the open position when assembling the electrical cooking element with the base.

20. The cooking appliance of claim 11 wherein the passage closure is movable to the closed position when disassembling the electrical cooking element with the base.

* * * * *